US008415451B2

(12) United States Patent
Ueda et al.

(10) Patent No.: US 8,415,451 B2
(45) Date of Patent: Apr. 9, 2013

(54) LIQUID CRYSTAL POLYIMIDE, LIQUID CRYSTAL RESIN COMPOSITION CONTAINING SAME, AND RESIN FILM FOR SEMICONDUCTOR ELEMENTS

(75) Inventors: Mitsuru Ueda, Tokyo (JP); Yu Shoji, Tokyo (JP); Fumikazu Mizutani, Tokyo (JP); Tomohide Murase, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/293,709

(22) Filed: Nov. 10, 2011

(65) Prior Publication Data

US 2012/0123050 A1    May 17, 2012

Related U.S. Application Data

(63) Continuation of application No. PCT/JP2010/057971, filed on May 11, 2010.

(30) Foreign Application Priority Data

May 11, 2009 (JP) ................... 2009-115031
Nov. 13, 2009 (JP) ................... 2009-260493

(51) Int. Cl.
*C08G 73/10* (2006.01)
*C08G 77/04* (2006.01)
*C08G 77/26* (2006.01)

(52) U.S. Cl.
USPC ................. 528/353; 528/26; 528/38

(58) Field of Classification Search .......... None
See application file for complete search history.

(56) References Cited

U.S. PATENT DOCUMENTS 4,040,874 A * 8/1977 Yerman .............. 148/33.3
4,139,547 A 2/1979 Berger (Continued)

FOREIGN PATENT DOCUMENTS

JP 57-123223 7/1982
JP 01-129071 5/1989

(Continued)

OTHER PUBLICATIONS

International Search Report issued Aug. 17, 2010 in PCT/JP2010/057971 filed May 11, 2010.

(Continued)

*Primary Examiner* — Robert S Loewe
(74) *Attorney, Agent, or Firm* — Oblon, Spivak, McClelland, Maier & Neustadt, L.L.P.

(57) ABSTRACT

A liquid crystal polyimide, containing: repeating units of formula (I) and having liquid crystallinity,

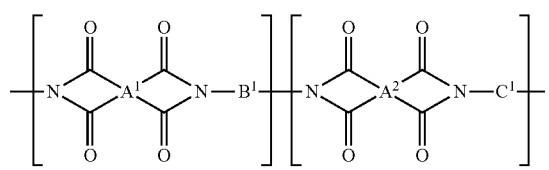

wherein $A^1$ and $A^2$ are each independently a tetravalent residue of a tetracarboxylic acid, $B^1$ is a residue of a bis(amino) polysiloxane of formula (II), and $C^1$ is a residue of an organic diamine,

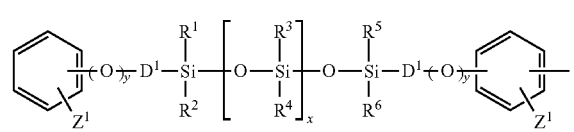

wherein $R^1$ to $R^6$ are each independently a lower alkyl group, x is from 0 to 10, $D^1$ is an alkylene group, y is 0 or 1, and $Z^1$ is selected from the group consisting of —H, —$CH_3$, $CF_3$, —F, —CN and —$NO_2$. In addition, a liquid crystal resin composition and a resin film for a semiconductor element containing the liquid crystal polyimide.

18 Claims, 2 Drawing Sheets

U.S. PATENT DOCUMENTS

| | | | |
|---|---|---|---|
| 4,381,886 A * | 5/1983 | Yokokura et al. | 428/1.26 |
| 4,395,527 A * | 7/1983 | Berger | 528/26 |
| 4,405,208 A * | 9/1983 | Shirai | 349/132 |
| 4,480,009 A * | 10/1984 | Berger | 428/447 |
| 4,494,824 A * | 1/1985 | Nakamura et al. | 349/132 |
| 4,499,149 A * | 2/1985 | Berger | 428/447 |
| 4,781,439 A * | 11/1988 | Yokokura et al. | 349/136 |
| 4,808,686 A * | 2/1989 | Cella et al. | 528/27 |
| 4,864,008 A * | 9/1989 | Murata et al. | 564/315 |
| 4,923,968 A * | 5/1990 | Kunimune et al. | 528/353 |
| 5,298,331 A * | 3/1994 | Kanakarajan et al. | 428/458 |
| 5,298,590 A * | 3/1994 | Isogai et al. | 528/188 |
| 6,441,127 B1 * | 8/2002 | Sawahata et al. | 528/353 |
| 6,468,664 B1 | 10/2002 | Park et al. | |
| 6,646,060 B1 * | 11/2003 | Toyohara et al. | 525/425 |
| 2006/0124693 A1 | 6/2006 | Meloni | |

FOREIGN PATENT DOCUMENTS

| | | |
|---|---|---|
| JP | 02-020523 | 1/1990 |
| JP | 2-147631 | 6/1990 |
| JP | 5-331282 | 12/1993 |
| JP | 6-16810 | 1/1994 |
| JP | 07-207024 | 8/1995 |
| JP | 08-302016 | 11/1996 |
| JP | 2006-169533 | 6/2006 |
| JP | 4118691 B2 | 7/2008 |
| JP | 2008-231255 | 10/2008 |
| JP | 2009-068002 | 4/2009 |
| JP | 2009-073875 | 4/2009 |

OTHER PUBLICATIONS

Yu Shoji et al.; "Synthesis of Thermotropic Liquid Crystalline Polyimides with Siloxane Linkages"; Chemistry Letters, 2009, vol. 38, No. 7, pp. 716-717.

Yu Shoji et al.; "Thermotropic Liquid Crystalline Polyimides with Siloxane Linkages: Synthesis, Characterization, and Liquid Crystalline Behavior"; Macromolecules, 2010, vol. 43, No. 2, pp. 805-810.

G. Costa et al.; "Segmented Polyimides with Poly(ethylene oxide) Blocks Exhibiting Liquid Crystallinity"; Macromolecules, 2008, vol. 41, No. 3, pp. 1034-1040.

* cited by examiner

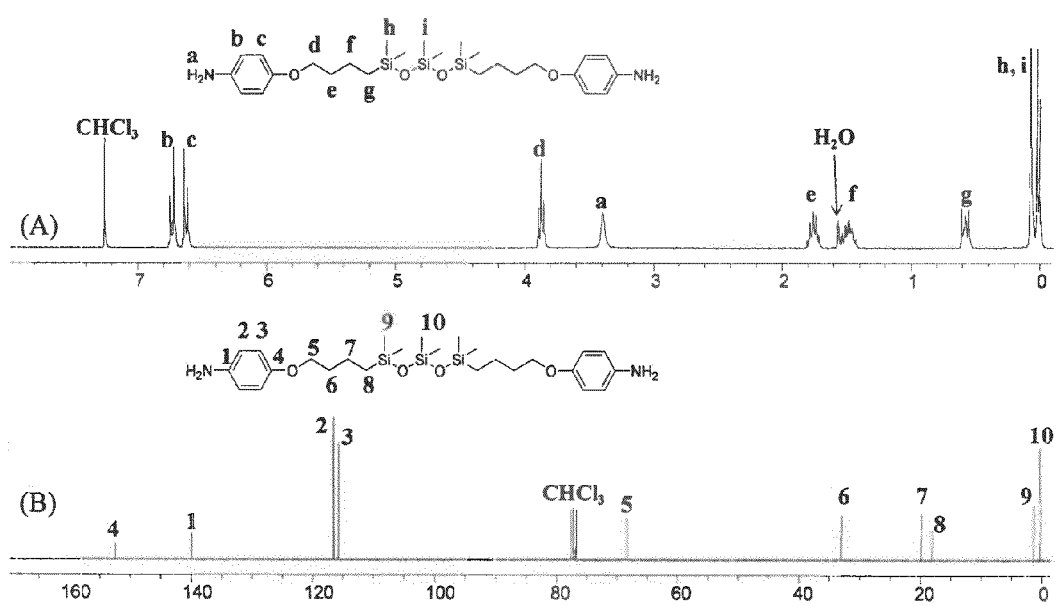

LIQUID CRYSTAL POLYIMIDE, LIQUID CRYSTAL RESIN COMPOSITION CONTAINING SAME, AND RESIN FILM FOR SEMICONDUCTOR ELEMENTS

TECHNICAL FIELD

The present invention relates to a resin film for semiconductor elements as represented by an adhesive layer for two-dimensional or three-dimensional semiconductor elements, an interlayer insulating film (passivation film), a surface protection film (overcoat film), an insulating film for a high-density packaging substrate, etc., a liquid crystal polyimide to be used for the resin film, and a liquid crystal resin composition containing the liquid crystal polyimide.

BACKGROUND ART

Recently, with the increase in performance of semiconductor elements due to their miniaturization or three-dimensionalization, there has been a trend that semiconductor elements consume a high electric power. Accordingly, semiconductor elements are likely to generate heat, and therefore the importance of a technique to efficiently release generated heat is growing.

Heretofore, as a resin film for semiconductor elements such as a surface protection film or an interlayer insulating film of semiconductor elements, a polyimide resin having an excellent heat resistance, mechanical property, etc. has been widely used (e.g. Patent Document 1). However, such a polyimide resin is likely to have an insufficient thermal conductivity, and therefore there is a problem such that the pace for improvement in performance of semiconductor elements has been declined.

Further, there is a report that it becomes possible to significantly increase thermal conductivity by controlling the high-order structure of an epoxy resin (e.g. Patent Document 2). However, there has been a problem such that the heat resistance of the epoxy resin is not sufficient for its use in a resin film for semiconductor elements.

Accordingly, for example, it has been attempted to increase the thermal conductivity of a resin film for semiconductor elements by using a polyimide resin having liquid crystallinity (e.g. Patent Documents 3 to 5).

PRIOR ART DOCUMENTS

Patent Documents
  Patent Document 1: JP-A-2008-231255
  Patent Document 2: JP-B-4118691
  Patent Document 3: JP-A-2-147631
  Patent Document 4: JP-A-5-331282
  Patent Document 5: JP-A-6-16810

DISCLOSURE OF INVENTION

Technical Problem

However, all of the polyimide resins disclosed in the above documents require a high temperature for acquiring liquid crystallinity. Therefore, if such polyimide resins are used as the material for a resin film for semiconductor elements as represented by an adhesive layer, an interlayer insulating film, etc. in which components having insufficient heat resistance are widely used, there has been a problem such that raising the temperature of the resin film for semiconductor elements to a temperature for acquiring liquid crystallinity is difficult, or components other than the resin film for semiconductor elements are possibly affected to some extent when the temperature is raised to a temperature for acquiring liquid crystallinity.

The present invention has been made in view of the above situation, and it is an object of the present invention to provide a liquid crystal polyimide having the high-order structure which can be controlled to have liquid crystallinity by a relatively low temperature process, a liquid crystal resin composition containing the liquid crystal polyimide, and a resin film for semiconductor elements containing the liquid crystal polyimide.

Solution to Problem

The inventors have conductor extensive studies, and as a result, have found that a polyimide having a specific structure can acquire liquid crystallinity at a relatively low temperature, whereby the present invention has been accomplished.

The present invention provides a liquid crystal polyimide characterized by at least partly comprising repeating units represented by the following formula (I) and having liquid crystallinity,

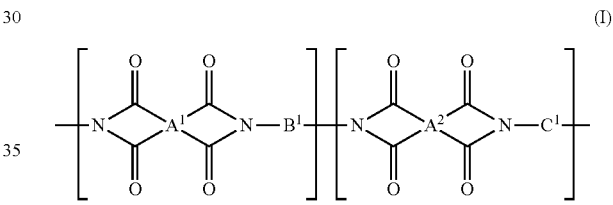

(wherein each of $A^1$ and $A^2$ which are independent of each other, is a tetravalent residue of a tetracarboxylic acid unit, $B^1$ is a residue of a bis(amino)polysiloxane unit represented by the following formula (II), and $C^1$ is a residue of an organic diamine,

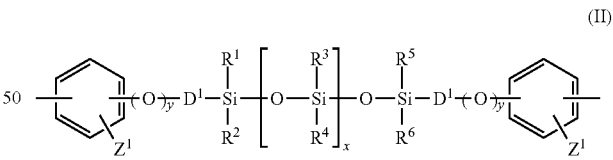

(wherein each of $R^1$ to $R^6$ which are independent of one another, is a lower alkyl group, x is an integer of from 0 to 10, $D^1$ is an alkylene group, y is 0 or 1, and $Z^1$ is one of the following groups: —H, —$CH_3$, $CF_3$, —F, —CN and —$NO_2$.)).

In the present invention, it is preferred that each of $A^1$ and $A^2$ in the formula (I) which are independent of each other, is a tetravalent benzene nucleus, a tetravalent naphthalene nucleus, a tetravalent perylene nucleus, a tetravalent cyclobutane nucleus, a tetravalent cyclopentane nucleus, a tetravalent cyclohexane nucleus or one of tetravalent groups represented by the following formula (III):

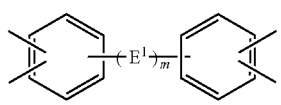 (III)

(wherein E¹ is one of the following divalent groups, m is 0 or 1, and n in the following formulae is 0 or 1,

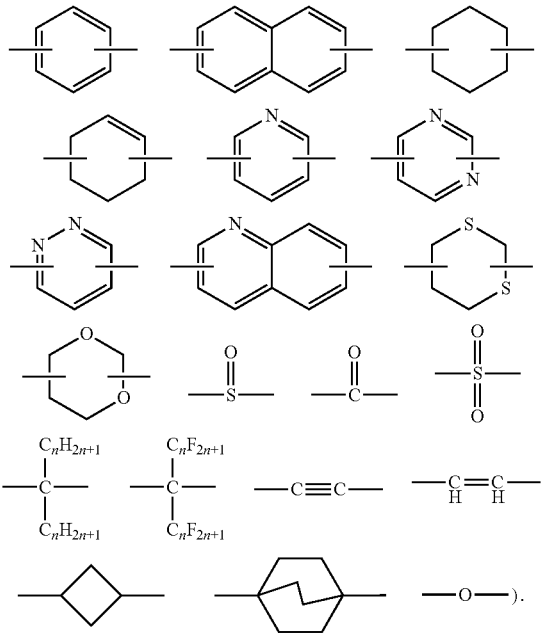

Further, in the formula (II), it is preferred that each of $R^1$ to $R^6$ which are independent of one another, is an alkyl group having from 1 to 3 carbon atoms, and it is more preferred that each of $R^1$ to $R^6$ is a methyl group.

Further, it is preferred that the above-described liquid crystal polyimide has a liquid crystal transition temperature of at most 260° C. during the temperature rise.

Further, it is preferred that the above-described liquid crystal polyimide is synthesized via a polyamide acid obtained by reacting a bis(amino)polysiloxane represented by the following formula (i):

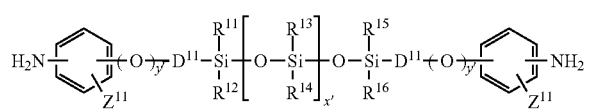 (i)

(wherein each of $R^{11}$ to $R^{16}$ which are independent of one another, is a lower alkyl group, x' is an integer of from 0 to 10, $D^{11}$ is an alkylene group, y' is 0 or 1, and $Z^{11}$ is one of the following groups: —H, —CH$_3$, CF$_3$, —F, —CN and —NO$_2$.), an organic diamine, and an acid dianhydride represented by the following formula (ii):

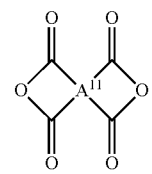 (ii)

(wherein $A^{11}$ is a tetravalent benzene nucleus, a tetravalent naphthalene nucleus, a tetravalent perylene nucleus, a tetravalent cyclobutane nucleus, a tetravalent cyclopentane nucleus, a tetravalent cyclohexane nucleus or one of tetravalent groups represented by the following formula (iii):

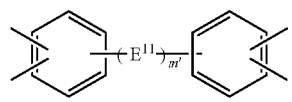 (iii)

(wherein $E^{11}$ is one of the following divalent groups, m' is 0 or 1, and n' in the following formulae is 0 or 1,

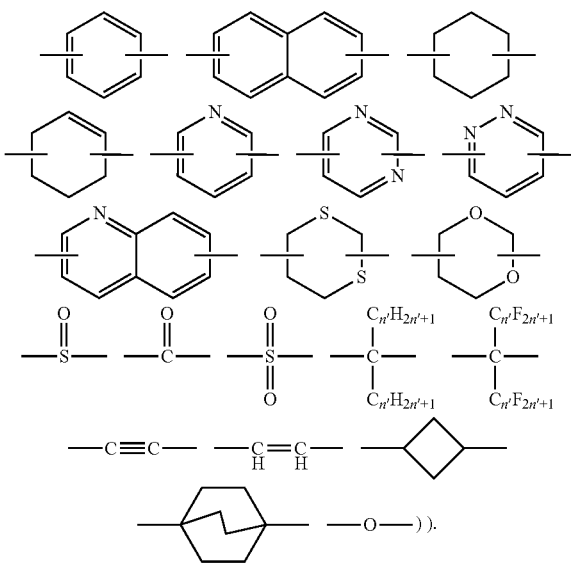

Further, the present invention also provides a liquid crystal resin composition characterized by containing the liquid crystal polyimide.

Further, it is preferred that the liquid crystal resin composition contains a thermally conductive filler.

It is preferred that the above-described liquid crystal resin composition acquires liquid crystallinity when heated at a temperature of at most 260° C., and retains crystal structure even at 25° C. after being cooled.

The present invention further provides a resin film for semiconductor elements characterized by containing the liquid crystal resin composition.

The present invention further provides a liquid crystal polyimide characterized by having a thermal conductivity of at least 0.22 W/m·K when it is formed into a liquid crystal film.

It is preferred that the liquid crystal polyimide has a phase transition temperature of at most 260° C.

Further, the present invention further provides an interlayer insulating film for three-dimensional semiconductor elements characterized by containing a liquid crystal polyimide and having a thermal conductivity of at least 1.5 W/m·K after acquiring liquid crystallinity.

The present invention still further provides a semiconductor element characterized by containing the above-described interlayer insulating film for three-dimensional semiconductor elements.

Advantageous Effect of Invention

The liquid crystal polyimide of the present invention at least partly comprises specific repeating units, whereby it can acquire liquid crystallinity at a relatively low temperature. Further, its thermal conductivity is supposed to become excellent by the liquid crystallinity. Therefore, in a case where the liquid crystal polyimide is used for e.g. a resin film for semiconductor elements, it becomes possible to acquire liquid crystallinity at a relatively low temperature without affecting other components of the semiconductor elements, thereby to form a film having an excellent thermal conductivity.

BRIEF DESCRIPTION OF DRAWINGS

FIG. 4 is a chart obtained by a nuclear magnetic resonance spectroscopy (NMR) measurement of the compound (3b) used in Example of the present invention, wherein (A) is a $^1$H NMR measurement result, and (B) is a $^{13}$C NMR measurement result.

DESCRIPTION OF EMBODIMENTS

Figure 1:
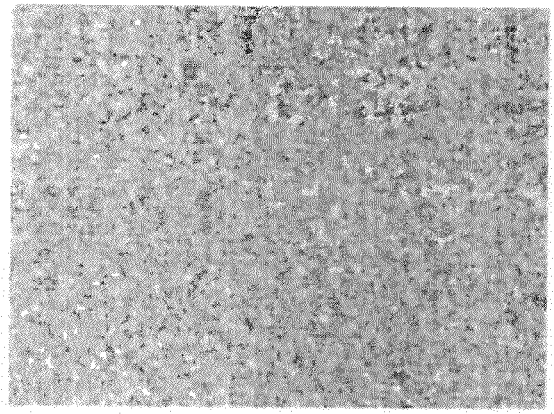
FIG. 1 is a polarization optical microscopy picture of the liquid crystal polyimide (6h) obtained in Example of the present invention.

The following examples, etc. are examples (representative examples) of embodiments of the present invention, but it should be understood that the present invention is by no means restricted thereto without departing from the scope of the present invention.

A. Liquid Crystal Polyimide

The liquid crystal polyimide of the present invention at least partly comprises the after-mentioned specific repeating units, and has liquid crystallinity. Here, the presence or absence of liquid crystallinity is usually determined by a differential scanning calorimeter (hereinafter also referred to as DSC) or a polarization optical microscope (hereinafter also referred to as POM) observation. In the measurement by using DSC, when a baseline shift or an endotherm/exotherm peak is found in a DSC chart at the time of the temperature rise or the temperature fall of samples, or at the time of the temperature rise and fall of a sample, it corresponds to a glass transition temperature or a phase transition temperature, and a knowledge regarding a liquid crystal phase of the sample can be obtained. Further, when various patterns i.e. optical textures are found by POM observation, they become an evidence suggesting that the sample has acquired a liquid crystal phase i.e. has liquid crystallinity.

As reasons as to why the liquid crystal polyimide of the present invention which at least partly comprising specific repeating units can acquire liquid crystallinity at a relatively low temperature, the followings may be mentioned.

Liquid crystal polymers are roughly classified into two types i.e. a molten (thermotropic) liquid crystal polymer and a solution (lyotropic) liquid crystal polymer. The liquid crystal polyimide of the present invention is classified as a main-chain type molten (thermotropic) liquid crystal polymer. Here, to prepare such a main-chain type liquid crystal polymer, it is required that a rigid mesogen group and a flexible spacer group are alternately linked in the polymer. Here, the higher the flexibility of the spacer group, the lower the liquid crystal transition temperature is expected with a short spacer length. As the spacer group, a methylene group or an oxymethylene group (its repeating structure) is widely used, but a siloxane group is known to have a higher flexibility than a methylene group or an oxymethylene group. Therefore, a polyimide in which a polysiloxane group is introduced into the main chain as a spacer group can have a lower liquid crystal transition temperature (even through it has a short molecular length) as compared to a case where a methylene group or an oxymethylene group (its repeating structure) is used.

Further, in the above-described main-chain type liquid crystal polymer, a balance between the orientation of mesogen groups and the flexibility (softness) of spacer groups is significantly important. For example, if the flexibility of the spacer groups is too low (the molecular length of the spacer group is too short), the mesogen groups are unlikely to be oriented because the mesogen groups can hardly move inside of the molecules, whereby crystallinity is unlikely to be exhibited. Further, for example, if the flexibility of the spacer groups is too high (the molecular length of the spacer group is too long), the orientation between mesogen groups is unlikely to be shown, whereby crystallinity is unlikely to be exhibited.

<Structure>

The liquid crystal polyimide of the present invention may at least partly comprise repeating units represented by the following formula (I), and in addition to the repeating units, repeating units not represented by the following formula (I) may be contained in its structure.

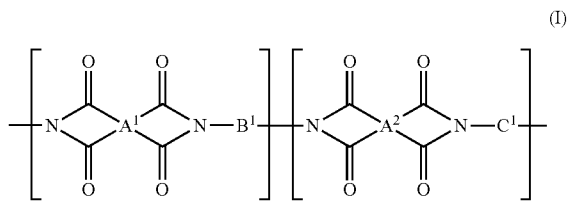

Further, in the liquid crystal polyimide of the present invention, only one type of repeating units represented by the above formula (I) may be contained, or two or more types of different repeating units represented by the above formula (I) may be contained.

(With Regard to $A^1$ and $A^2$ in the Formula (I))

In the above formula (I), each of $A^1$ and $A^2$ which are independent of each other, is a tetravalent residue of a tetracarboxylic acid unit. The tetravalent residue of a tetracarboxylic acid unit is a tetravalent group bonded to four carbonyl groups of the tetracarboxylic acid unit of the formula (I). $A^1$ and $A^2$ may be identical or different from each other.

The group represented by $A^1$ or $A^2$ is preferably a group containing a ring structure, and may only have a saturated bond or have an unsaturated bond.

Specifically, it is preferably a tetravalent benzene nucleus, a tetravalent naphthalene nucleus, a tetravalent perylene nucleus, a tetravalent cyclobutane nucleus, a tetravalent cyclopentane nucleus, a tetravalent cyclohexane nucleus or one of tetravalent groups represented by the following formula (III).

Further, they may have a substituent. Such a substituent may be selected optionally so long as it does not significantly impair the effects of the present invention, and specifically, a substituted or unsubstituted methyl group such as —$CH_3$ or —$CF_3$; a —CN group; a —$NO_2$ group; or a halogen group such as —F, —Cl, —Br or the like, may, for example, be mentioned as the substituent. Further, when the group represented by $A^1$ or $A^2$ has a substituent, the number of substituents may be one or at least two. Further, when the group represented by $A^1$ or $A^2$ has at least two substituents, these substituents may be identical or different from one another.

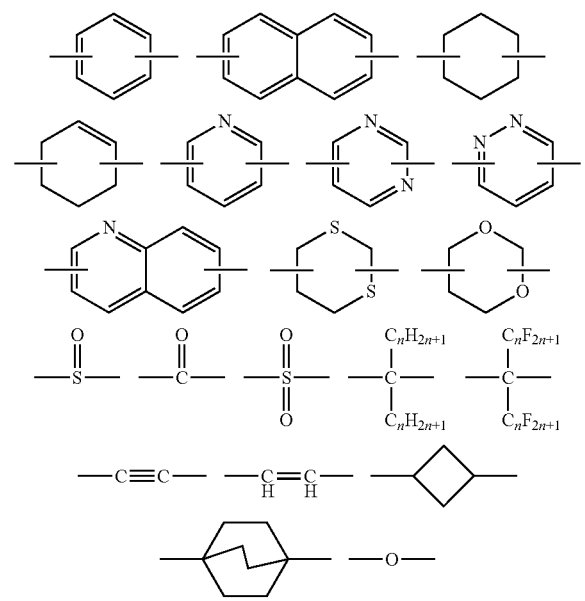

(III)

In the above formula (III), m is 0 or 1.

Further, in the above formula (III), $E^1$ is a divalent linking group, and such a divalent linking group may be selected optionally so long as it does not significantly impair the effect of the present invention, and is particularly preferably any one of the following divalent groups. In the following formulae, n is 0 or 1.

Among them, the followings may be mentioned as more preferable ones in view of their rigidity of molecules and availability.

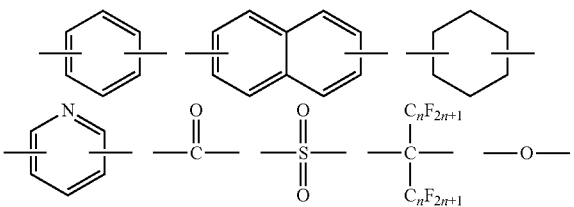

Further, the binding positions on the above $A^1$ of the four carbonyl groups of the tetracarboxylic acid residue may be selected optionally so long as they do not significantly impair the effects of the present invention.

(With Regard to $B^1$ in the Formula (I))

$B^1$ of the above formula (I) is a residue of a bis(amino) polysiloxane unit represented by the following formula (II). "Residue of a bis(amino)polysiloxane unit" of the present invention is a group having a polysiloxane backbone which is bonded to two nitrogen atoms via linking groups in the bis (amino)polysiloxane unit in the formula (I), and is represented by the following formula (II).

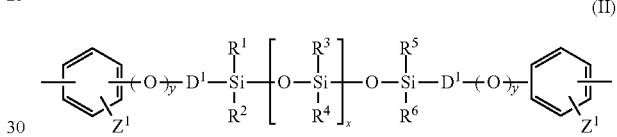

(II)

Further, the linking groups may be groups represented by the following formula in the above formula (II).

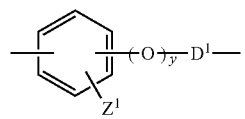

In the formula (II), x is usually at least 0, preferably at least 1. Further, x is usually at most 10, preferably at most 8, and more preferably at most 6. By adjusting x to be within the above range, it becomes possible to achieve both a good synthesis yield and a suitable liquid crystal transition temperature.

Further, in the formula (II), each of $R^1$ to $R^6$ which are independent of one another is a lower alkyl group, and $R^1$ to $R^6$ may be different from one another, partially different from, or all identical to one another. Here, the lower alkyl group of the present invention is an alkyl group having at most 4 carbon atoms. The lower alkyl groups represented by the above $R^1$ to $R^6$ may be linear or branched.

Particularly, the number of carbon atoms of each of the above $R^1$ to $R^6$ is usually at least 1, and is usually at most 4, more preferably at most 3. Particularly preferred is a case where each of $R^1$ to $R^6$ is a methyl group.

Further, in the formula (II), $D^1$ is an alkylene group, and $D^1$ shown at right and left in the formula (II) are usually identical to each other. $D^1$ may be linear or branched. Further, its number of carbon atoms is usually at least 1, preferably at least 2, and is usually at most 10, preferably at most 8, more preferably at most 6.

Specifically, the above alkylene group is preferably an ethylene group, a butylene group, a hexylene group or an octylene group. Among them, a butylene group, a hexylene group or an octylene group is preferred, and a butylene group or a hexylene group is particularly preferred in view of easiness in synthesis.

In the above formula (II), y is 0 or 1. Here, y being 0 means that a group represented by —O— does not exist. Further, usually, y shown at right and left in the above formula (II) are identical to each other.

Further, in the above formula (II), $Z^1$ is one of the following groups: —H, —CH$_3$, —CF$_3$, —F, —CN and —NO$_2$. And usually $Z^1$ shown at right and left are groups identical to each other. Further, $Z^1$ being —H means that the phenylene group is not substituted.

The binding position of $Z^1$ may be any position so long as it does not significantly impair the effects of the present invention.

(With Regard to $C^1$ of the Above Formula (I))

$C^1$ in the formula (I) is a residue of an organic diamine. The residue of an organic diamine is an organic group of an organic diamine to be used in production of the liquid crystal polyimide of the present invention, excluding the amine portions.

The residue of an organic diamine represented by $C^1$ is a divalent residue represented by Z in the formula H$_2$N—Z—NH$_2$. As a preferred example of Z, a residue of an aromatic diamine may, for example, be mentioned. Specifically, a group represented by the above formula (II), a phenylene group, a diphenylene group, a naphthylene group or a group represented by the following formula (IV) may be mentioned. Further, when the residue represented by $C^1$ is a group represented by the formula (II), both $B^1$ and $C^1$ may be identical to each other.

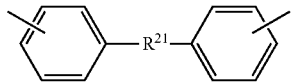
(IV)

(In the above formula (IV), $R^{21}$ is any one of a linear or branched alkylene group having from 1 to 20 carbon atoms, —S—, —O—,

and —O-G'-O— (wherein, G' is a phenylene group or a group represented by the following formula:

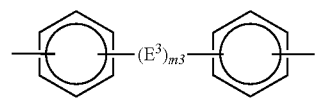

wherein m$^3$ is 0 or 1, and E$^3$ is —S—, —O—,

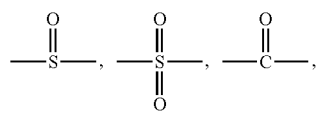

or a linear or branched alkylene group having from 1 to 8 carbon atoms.)).

The above aryl nucleus may be substituted by a lower alkyl group, a lower alkoxy group or a group which does not impair the object and effects of the present invention.

As preferred examples of the organic diamine, the followings may be mentioned.

m-Phenylene diamine,
p-phenylene diamine,
4,4'-diamino diphenyl propane,
4,4'-diamino diphenyl methane,
benzidine
4,4'-diamino diphenyl sulfide,
4,4'-diamino diphenyl sulfone,
4,4'-diamino diphenyl ether,
1,5-diamino naphthalene,
3,3'-dimethyl benzidine,
3,3'-dimethoxy benzidine,
2,4-bis(β-amino-t-butyl)toluene,
bis(p-β-amino-t-butyl)phenyl ether,
bis(p-β-methyl-o-aminopentyl)benzene,
1,3-diamino-4-isopropyl benzene,
1,2-bis(3-aminopropoxy)ethane,
m-xylene diamine,
p-xylene diamine,
bis(4-aminocyclohexyl)methane,
decamethylene diamine,
3-methyl heptamethylene diamine,
4,4'-dimethyl heptamethylene diamine,
2,11-dodecane diamine,
2,2-dimethyl propylene diamine,
octamethylene diamine,
3-methoxy hexamethylene diamine,
2,5-dimethyl hexamethylene diamine,
2,5-dimethyl heptamethylene diamine,
3-methyl heptamethylene diamine,
5-methyl nonamethylene diamine,
1,4-cyclohexane diamine,
1,12-octadecane diamine,
bis(3-aminopropyl) sulfide,
N-methyl-bis(3-aminopropyl) amine,
hexamethylene diamine,
heptamethylene diamine,
nonamethylene diamine, etc. may be mentioned.

Further, as specific examples of the organic diamine wherein the above $R^{21}$ is represented by —O-G'-O—, the followings may be mentioned.

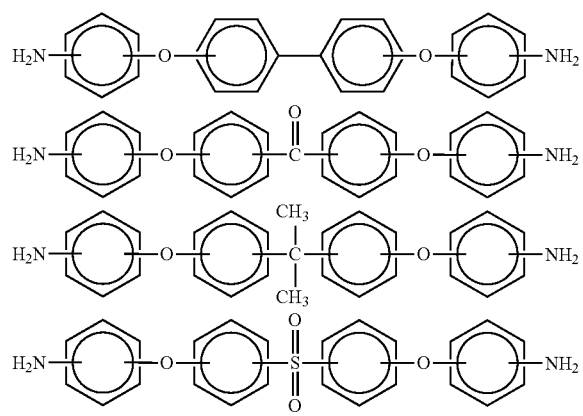

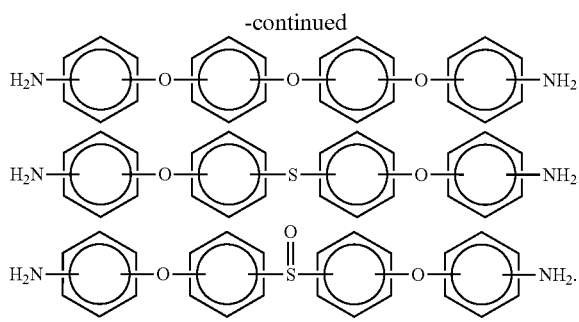

Further, ones in which an ether bond in the above formulae is substituted by —S—,

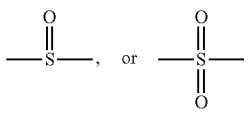

may, for example, be mentioned.

The above-described organic diamine provides solubility to the liquid crystal polyimide of the present invention produced by using it. When producing the liquid crystal polyimide of the present invention, the above-described organic diamines may be used alone or in combination of two or more of them in an optional ratio.

<Production Process>

The process for production of the above-described liquid crystal polyimide may be a known process, and is not particularly limited so long as it is a process which can produce the above-described liquid crystal polyimide and does not significantly impair the object of the present invention.

In the present invention, it is particularly preferred that the liquid crystal polyimide is synthesized via a polyamide acid obtained by reacting a bis(amino)polysiloxane represented by the following formula (i):

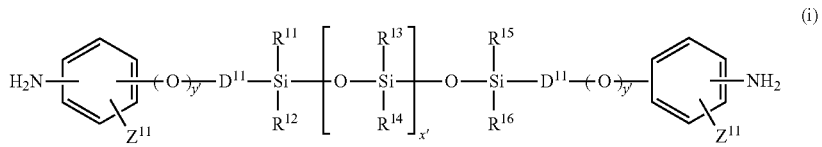

(wherein each of $R^{11}$ to $R^{16}$ which are independent of one another, is a lower alkyl group, x' is an integer of from 0 to 10, $D^{11}$ is an alkylene group and y' is 0 or 1, and $Z^{11}$ is one of the following groups: —H, —$CH_3$, —$CF_3$, —F, —CN and —$NO_2$.), an organic diamine, and an acid dianhydride represented by the following formula (ii):

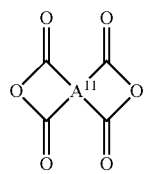

(wherein $A^{11}$ is a tetravalent benzene nucleus, a tetravalent naphthalene nucleus, a tetravalent perylene nucleus, a tetravalent cyclobutane nucleus, a tetravalent cyclopentane nucleus, a tetravalent cyclohexane nucleus or one of tetravalent groups represented by the following formula (iii):

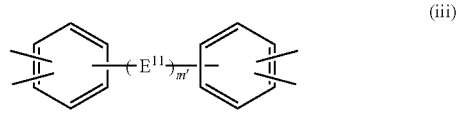

(wherein $E^{11}$ is one of the following divalent groups, m' is 0 or 1, and n' in the following formulae is 0 or 1,

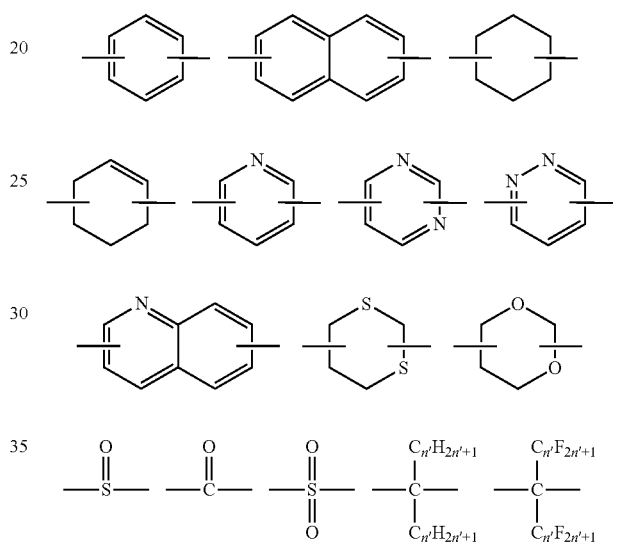

-continued

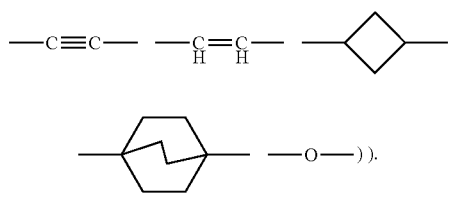

It is thereby possible to obtain the above-described liquid polyimide easily in good yield.

Now, such a process will be described, but it should be understood that the process for production of the liquid crystal polyimide of the present invention is by no means restricted thereto.

(Bis(amino) Polysiloxane Represented by the Formula (i))

The bis(amino)polysiloxane to be used in the production of the liquid crystal polyimide of the present invention is represented by the following formula (i).

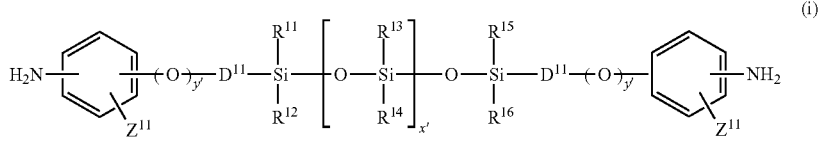

(i)

In the formula (i), x' is usually at least 0, preferably at least 1. Further, it is usually at most 10, preferably at most 8, more preferably at most 6. By adjusting the number of x' to be within the above range, it becomes possible to achieve both a good synthesis yield and a suitable liquid crystal transition temperature.

In the above formula (i), each of $R^{11}$ to $R^{16}$ which are independent of one another is a lower alkyl group, and $R^{11}$ to $R^{16}$ may be different from one another, partially different, or all identical to one another. Here, the lower alkyl group of the present invention is an alkyl group having at most 4 carbon atoms, as described above. The lower alkyl group represented by each of $R^{11}$ to $R^{16}$ may be linear or branched.

Among them, particularly, each of $R^{11}$ to $R^{16}$ usually has at least 1 carbon atom, and usually has at most 4 carbon atoms, more preferably at most 3 carbon atoms. Particularly preferred is a case where each of $R^{11}$ to $R^{16}$ is a methyl group.

Further, $D^{11}$ is an alkylene group, and $D^{11}$ shown at right and left in the formula (i) are usually identical to each other. $D^{11}$ may be linear or branched. Further, $D^{11}$ usually has at least 1 carbon atom, preferably at least 2 carbon atoms, and usually has at most 10 carbon atoms, preferably at most 8 carbon atoms, more preferably at most 6 carbon atoms. Specifically, the above alkylene group is preferably an ethylene group, a butylene group, a hexylene group, an octylene group or the like. Among them, a butylene group, a hexylene group or an octylene group is more preferred, and a butylene group or a hexylene group is particularly preferred in view of easiness in synthesis.

In the above formula (i), y' is 0 or 1, and y' shown at right and left in the formula (i) are usually identical to each other.

Further, in the above formula (i), $Z^{11}$ is one of the following groups: —H, —$CH_3$, —$CF_3$, —F, —CN and —$NO_2$. And usually $Z^{11}$ shown at right and left are identical to each other. Further, $Z^{11}$ being —H means that the phenylene group is not substituted.

The binding position of $Z^{11}$ may be any position so long as it does not significantly impair the effects of the present invention.

Further, the bis(amino)polysiloxanes represented by the above formula (i) may be used alone or in combination of two or more of them in an optional ratio.

In the after-mentioned condensation reaction, the amount of the bis(amino) polysiloxane represented by the above formula (i) to be used is usually adjusted so that the total of the molar amount of the above bis(amino)polysiloxane and the molar amount of the after-mentioned organic diamine becomes equimolar to the amount of the acid dianhydride represented by the formula (ii), but it is not restricted thereto.

(Organic Diamine)

The organic diamine to be used for producing the liquid crystal polyimide of the present invention is not particularly limited so long as it is an organic compound containing two amines in its structure, unless it significantly impairs the object of the present invention. As such an organic diamine, an organic diamine described in section regarding $C^1$ in the above formula (I) may be mentioned. Further, the above-described bis(amino)polysiloxane may be used as the organic diamine. They may be used alone or in combination of two or more of them in an optional ratio.

The amount of the organic diamine to be used in the after-mentioned condensation reaction is usually adjusted so that the total of the molar amount of the above-described bis (amino)polysiloxane and the molar amount of the after-mentioned organic diamine becomes equimolar to the amount of the acid dianhydride represented by the formula (ii), as described above, but it is not restricted thereto.

Further, when the organic diamine and the bis(amino)polysiloxane represented by the above formula (i) are different from each other, they are used in such a ratio that the molar amount of the above bis(amino)polysiloxane is usually at least one time, preferably at least two times, more preferably at least four times, and is usually at most 10,000 times, preferably at most 1,000 times, more preferably at most 500 times, of the molar amount of the organic diamine. By adjusting the molar amount to be at most such an upper limit, it becomes possible to control polymer properties, and by adjusting the molar amount to be at least such a lower limit, it becomes possible to achieve both desirable polymer properties and lowering of the phase transition temperature.

(Acid Dianhydride Represented by Formula (II))

The acid dianhydride to be used for producing the liquid crystal polyimide of the present invention is represented by the following formula (ii).

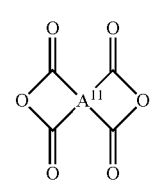

(ii)

In the formula (ii), $A^{11}$ is a tetravalent benzene nucleus, a tetravalent naphthalene nucleus, a tetravalent perylene nucleus, a tetravalent cyclobutane nucleus, a tetravalent cyclopentane nucleus, a tetravalent cyclohexane nucleus or one of tetravalent groups represented by the following formula (iii).

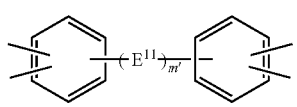

(iii)

In the formula (iii), $E^{11}$ is one of the following divalent groups, and m' is 0 or 1. Further, n' in the following formulae is 0 or 1.

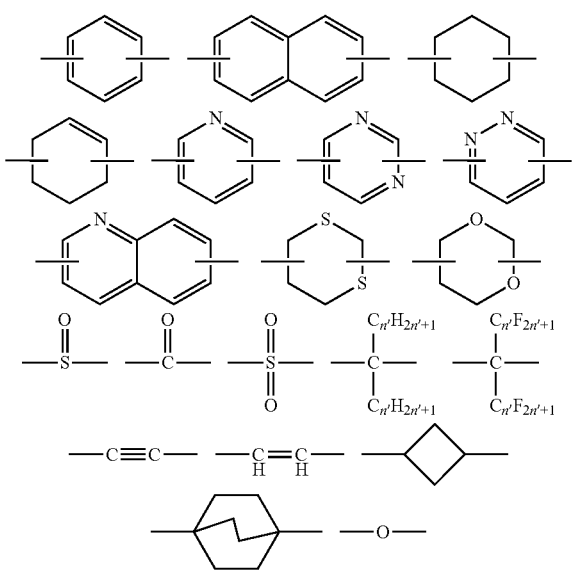

Among them, the followings may be mentioned as more preferable ones in view of their rigidity of molecules and availability.

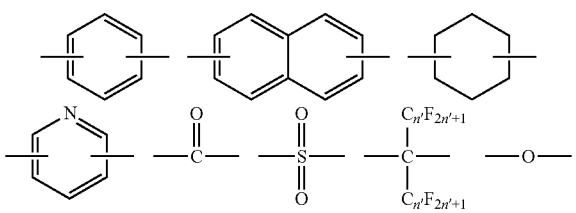

Further, a group represented by $A^{11}$ may have a substituent. Such a substituent may be selected optionally so long as it does not significantly impair the effects of the present invention, and specifically, a substituted or unsubstituted methyl group such as —$CH_3$ or —$CF_3$; a —CN group; a —$NO_2$ group; or a halogen group such as —F, —Cl, —Br or the like, may, for example, be mentioned as the substituent. Further, when the group represented by $A^{11}$ has a substituent, the number of substituents may be one or at least two. Further, when the group represented by $A^{11}$ has at least two substituents, these substituents may be identical or different from one another.

The above-described acid dianhydrides may be used alone or in combination as a mixture of two or more of them.

(Condensation Reaction)

The liquid crystal polyimide of the present invention is preferably one which is synthesized via a polyamide acid obtained by reacting a bis(amino)polysiloxane represented by the above formula (i), an organic diamine, and an acid dianhydride represented by the above formula (ii).

Specifically, a bis(amino)polysiloxane represented by the above formula (i), an organic diamine, and an acid dianhydride represented by the above formula (ii) are reacted, thereby to obtain a polyamide acid. Such a polyamide acid may be obtained by, for example, reacting an acid dianhydride represented by the above formula (ii) and a bis(amino) polysiloxane, followed by mixing an organic diamine for further reaction, or reacting an acid dianhydride represented by the above formula (ii) and an organic diamine, followed by mixing a bis(amino)polysiloxane for further reaction. Otherwise, all of an acid dianhydride represented by the above formula (ii), a bis(amino) polysiloxane and an organic diamine may be mixed and reacted. Further, for such a reaction, an organic solvent, a catalyst or the like may be used as the case requires.

The above-described reaction to obtain a polyamide acid is usually carried out at at least 0° C., preferably at least 10° C., more preferably at least 20° C. Further, it is usually carried out at most 300° C., preferably at most 200° C., more preferably at most 100° C., particularly preferably at most 30° C. It is thereby possible to increase a yield and suppress a side reaction.

Further, the pressure for the above-reaction is not particularly limited, and is usually at least 0.1 atm, preferably at least 0.5 atm, more preferably at least 0.8 atm. Further, it is usually at most 200 atm, preferably at most 100 atm, more preferably at most 10 atm. Particularly preferred is normal pressure.

Further, the duration of the above-described reaction is usually at least 0.1 hr, preferably at least 0.5 hr, more preferably at least 1 hr, and is usually at most 48 hrs, preferably at most 30 hrs, more preferably at most 24 hrs. It is thereby possible to carry out the reaction efficiently.

The organic solvent used for the above-described reaction is not particularly limited, and may, for example, be N,N-dimethyl formamide, N,N-dimethyl acetamide, N,N-diethyl formamide, N,N-diethyl acetamide, N,N-dimethylmethoxy acetamide, dimethyl sulfoxide, N-methyl-2-pyrrolidone, pyridine, dimethyl sulfone, hexamethyl phosphoramide, tetramethylene sulfone, phenol, a phenol-water mixture or dimethyltetramethylene sulfone. These organic solvents may be used alone or in combination of two or more of them in an optional ratio. Further, the above-described organic solvents may be mixed with other inactive solvents such as benzene, benzonitrile, dioxane, β-ethoxyethyl acetate, butyrol acetone, xylene, toluene and cyclohexanone.

The polyamide acid obtained by the above-described reaction is subjected to imidization by heating or imidization by using an imidization agent etc., thereby to obtain the liquid crystal polyimide of the present invention.

The imidization by heating is usually carried out at least 100° C., preferably at least 150° C., more preferably at least 200° C. Further, it is usually carried out at most 600° C., preferably at most 500° C., more preferably at most 400° C. By adjusting the temperature to be at least such a lower limit, it becomes possible to improve the conversion efficiency of a polyamide acid to a polyimide, and by adjusting the temperature to be at most such an upper limit, it becomes possible to suppress degradation of a polyamide. The above-described imidization by heating may be carried out in a manner such that the temperature is stepwise changed for heating.

The above-described imidization by heating may be carried out under atmospheric pressure, or carried out in an inert atmosphere such as a nitrogen atmosphere.

The method for heating is not particularly limited, and a hot plate, an oven, a heat block and a hot press may, for example, be used for heating. Further, heating time is usually at least 0.5 hr, preferably at least 1 hr, more preferably at least 1.5 hrs, and is usually at most 10 hrs, preferably at most 8 hrs, more preferably at most 6 hrs.

Further, as the imidization agent, an amine compound is usually used, and an acid anhydride may be used in combination for dehydration. Specifically, a mixture of pyridine and acetic anhydride may, for example, be used. They are used in a molar amount of usually at least 2 times, preferably at least 5 times of the molar amount of the above-described polyamide acid, and are usually used in a molar amount of at most 1,000 times of the molar amount of the above-described polyamide acid.

The polyimide obtained by the above-described method is usually obtained in a crystal state, and then subjected to transition to a liquid crystal phase by the temperature rise. Therefore, in the present invention, such a polyimide is usually subjected to heating at a temperature of at least the liquid crystal transition temperature (hereinafter also referred to as phase transition temperature) to obtain a liquid crystal polyimide. In the present invention, such a temperature to obtain liquid crystallinity is preferably at least 30° C., more preferably at least 50° C., further preferably at least 60° C. Further, it is preferably at most 260° C., more preferably at most 255° C., further preferably at most 250° C.

The above-described liquid crystal transition temperature is measured by using DSC.

Further, it is preferred that the liquid crystal polyimide of the present invention is one which retains liquid crystal domains when cooled to room temperature (usually 25° C.) after the transition to a liquid crystal phase, i.e. one which has a liquid crystal structure even at 25° C. after being cooled. Further, in a case where it has a composition by which liquid crystal domains are formed by the temperature rise and then the liquid crystal domains disappear after being gradually cooled, a method of fixing the liquid crystal domains by conducting rapid cooling is effective. The rapid cooling is preferably carried out at a cooling rate of at least 3° C./min, more preferably at least 5° C./min, further preferably at least 10° C./min.

(Others)

The liquid crystal polyimide at least partly comprising specific repeating units is described above, and by using the liquid crystal polyimide of the present invention, it is possible to obtain a liquid crystal film having a thermal conductivity of at least 0.22 W/m·K.

Further, the thermal conductivity when it is formed into a liquid crystal film is a thermal conductivity at the time of having acquired liquid crystallinity at a temperature lower than the temperature at which the liquid crystal polyimide is heated to achieve an isotropic phase.

Usually, a resin has a significantly lower thermal conductivity as compared to a metal or ceramics in general. Since there is a limitation in improving the thermal conductivity of a resin, usually, it has been carried out that a resin is conjugated with a highly thermal conductive inorganic filler, thereby to increase the thermal conductivity of the resin material. If the thermal conductivity of a resin is low, a large amount of an inorganic filler is required to be introduced to increase the thermal conductivity, whereby its moldability tends to decrease. Accordingly, by improving the thermal conductivity of a resin, it becomes possible to reduce the volume percentage of an inorganic filler to be used for achieving the same level of thermal conductivity, whereby the moldability of a conjugated material can be improved.

In the present invention, it is preferred that the thermal conductivity of the liquid crystal polyimide is at least 0.22 W/m·K, whereby it becomes possible to reduce the amount of an inorganic filler, at the time of preparing a liquid crystal resin composition by conjugating it with an inorganic filler, to a level such that the moldability of e.g. a film formed by using the liquid crystal resin composition is maintained.

The above-described thermal conductivity is preferably at least 0.24, more preferably at least 0.25. Further, the thermal conductivity can be measured by the method described in the after-mentioned Examples.

The thermal conductivity relates to a degree of orientation of molecular chains in the liquid crystal polyimide. Accordingly, as a method to achieve the above-described thermal conductivity of the liquid crystal polyimide, a method of growing the region where molecules are oriented in the liquid crystal polyimide, or growing the crystalline region of polymer chains, may be mentioned. Specifically, a method of increasing a fraction of a mesogen portion contained in a polymer chain of the liquid crystal polyimide, introducing a substituent which increases an interaction between mesogen portions, introducing a nucleating agent which induces crystallization liquid-crystallization, controlling heat treatment condition in a crystallization liquid-crystallization process to prepare a condition in which mesogen groups tend to be oriented, may be mentioned.

Further, the phase transition temperature (a temperature where melting begins by heating i.e. a temperature where phase transition to an isotropic phase occurs) of the liquid crystal polyimide is preferably at most 260° C., more preferably at most 255° C., further preferably at most 250° C. Further, the phase transition temperature is preferably at least 0° C. The phase transition temperature is measured by using DSC.

When the liquid crystal polyimide or the after-mentioned liquid crystal resin composition is subjected to heat molding, a lower temperature for heat molding is beneficial. The temperature for molding of the liquid crystal polyimide of the present invention is a temperature around its phase transition temperature to an isotropic phase. Particularly preferred is a case where it can be molded at a temperature around the upper limit temperature of lead-free solder reflow furnace (at most 260° C.), in view of productivity.

As a method to adjust the phase transition temperature of the liquid crystal polyimide to be a temperature of at least the above-described upper limit, controlling a balance between mesogen portions contained in polymer chains of the liquid crystal polyimide and flexible portions, or controlling an interaction between molecular chains to attenuate the interaction by introducing a substituent to a structure constituting polymer chains may, for example, be mentioned.

B. Liquid Crystal Resin Composition

The liquid crystal resin composition of the present invention contains the above-described liquid crystal polyimide, and may be one which contains one type of the above-described liquid crystal polyimide alone or two or more types in combination in an optional ratio.

In the present invention, the liquid crystal polyimide is contained in the liquid crystal resin composition in an amount of preferably at least 1 wt %, more preferably at least 10 wt %, further preferably at least 20 wt %. Further, it is usually at most 100 wt %, preferably at most 99.9 wt %, more preferably at most 99.5 wt %. By adjusting it to be at least such a lower limit, it becomes possible to let the liquid crystal resin composition have the liquid crystallinity at a relatively low temperature.

The liquid crystal resin composition of the present invention is, usually, one which acquires liquid crystallinity by the temperature rise, and the condition such as a temperature, and the method, etc. for acquiring liquid crystallinity are identical to those of the above-described liquid crystal polyimide regarding acquiring liquid crystallinity and formation/maintenance of liquid crystal domains.

(Other Resins)

Further, the liquid crystal resin composition of the present invention may contain resins other than the above-described liquid crystal polyimide resin. Such other resins are not particularly limited so long as they are compatible with the above-described liquid crystal polyimide and do not significantly impair the effects of the present invention.

Such resins may, for example, be a polyimide resin other than the above-described ones, an epoxy resin, an acrylic resin, a polyurethane resin, etc.

Such other resins are used in an amount of usually at least 0.01 wt %, preferably at least 0.1 wt %, more preferably at least 1 wt %, based on the liquid crystal polyimide. Further, the amount is usually at most 99 wt %, preferably at most 95 wt %, more preferably at most 90 wt %. By adjusting the amount to be at least such an upper limit, it is possible to obtain a resin system also having properties of the liquid crystal polyimide. Further, by adjusting it to be at least such a lower limit, it is possible to achieve an effect such that a resin system also having properties of other resins can be obtained.

(Thermally Conductive Filler)

Further, the liquid crystal resin composition of the present invention preferably contains a thermally conductive filler. In the present invention, a thermally conductive filler means a filler having a bulk thermal conductivity of at least 1 W/m·K. The thermal conductivity may be one disclosed in a various handbook, etc.

The thermally conductive filler may be boron nitride (BN), alumina ($Al_2O_3$), aluminum nitride (AlN), silicon nitride, silica ($SiO_2$) or the like, but other fillers may be used suitably.

By mixing a thermally conductive filler, even in a case where the liquid crystallinity of liquid crystal polyimide is not relatively high, a high thermal conductive path can be obtained from liquid crystal domains of liquid crystal polyimide and the thermally conductive filler, whereby it becomes possible to achieve a high thermal conductivity consequentially. Further, by containing a thermally conductive filler, it becomes also possible to lower the heat treatment temperature to let the liquid crystal resin composition acquire liquid crystallinity.

The content of the thermally conductive filler in the liquid crystal resin composition is usually at least 1 wt %, preferably at least 5 wt %, more preferably at least 10 wt %, based on the amount of the above-described liquid crystal polyimide. Further, it is usually at most 99 wt %, preferably at most 95 wt %, more preferably at most 90 wt %. By adjusting it to be at least such a lower limit, it is possible to obtain a good thermal conductivity. Further, by adjusting it to be at most such an upper limit, it is possible to maintain the moldability.

(Others)

The liquid crystal resin composition of the present invention may contain various additives, etc. within a range not to impair the object and effects of the present invention. Such additives may, for example, be a photosensitizer, a sensitizer, etc. By containing a photosensitizer, a sensitizer, etc., it becomes possible to make a film coating process easier when e.g. the resin composition is used for an application to e.g. a resin film for semiconductor elements.

(Application)

The liquid crystal resin composition of the present invention has liquid crystallinity at a relatively low temperature, whereby it can have an excellent thermal conductivity. Accordingly, it can be used for an application to e.g. the after-mentioned resin film for semiconductor elements, a thermally conductive print substrate and a heat release sheet.

Further, the above-described liquid crystal resin composition can be processed to e.g. a various molded body, a film and a fibrous structure, and therefore it can be used for various applications.

C. Resin Film for Semiconductor Elements

The resin film for semiconductor elements of the present invention contains the above-described liquid crystal resin composition. As the application of the resin film for semiconductor elements, an adhesive layer for two-dimensional or three-dimensional semiconductor elements, an interlayer insulating film (passivation film), a surface protection film (overcoat film), an insulating film for a high-density packaging substrate may, for example, be mentioned.

The method for forming the resin film for semiconductor elements may, for example, be a method wherein the above-described liquid crystal resin composition is melted by heating and then applied and cured, or a method wherein the above-described liquid crystal resin composition is heated and pressed to mold it. Further, a coating by using a dispenser, a screen printing etc., or a spin coating may, for example, be carried out.

The preferred film thickness of such a resin film for semiconductor elements is usually at least 1 μm, preferably at least 2 μm, more preferably at least 3 μm. Further, it is usually at most 50 μm, preferably at most 30 μm, more preferably at most 25 μm. By adjusting it be at least such a lower limit, it is estimated that a film having a high thermal conductivity can be obtained. Further, by adjusting it to be at most such an upper limit, it is possible to reduce the thickness of semiconductor elements efficiently.

Further, particularly, the above-described interlayer insulating film for three-dimensional semiconductor elements preferably has a thermal conductivity of at least 1.5 W/m·K after acquiring liquid crystallinity. By adjusting the thermal conductivity of the interlayer insulating film for three-dimensional semiconductor elements to be at least the above value, it becomes easier to design heat release of semiconductor elements by using the interlayer insulating film for three-dimensional semiconductor elements. The above-described thermal conductivity is preferably at least 1.8 m·K, more preferably at least 2.2 m·K. Further, the thermal conductivity after acquiring liquid crystallinity may be measured by e.g. a method described in Examples given hereinafter.

The thermal conductivity of the above-described interlayer insulating film for three-dimensional semiconductor elements correlates to the interaction between an oriented region of molecular chains in the liquid crystal polyimide and a crystalline region of an inorganic filler. Accordingly, by designing polymer chains of the liquid crystal polyimide so that they have a strong interaction to the crystalline surface of an organic filler, or by carrying out surface treatment of the surface of an inorganic filler so as to facilitate its interaction to polymer chains, it becomes possible to improve an interface interaction between the oriented region of the liquid crystal polyimide and the crystalline region of the inorganic filler, thereby to achieve the above-described thermal conductivity values.

EXAMPLES

Now, the present invention will be described in further detail with reference to Examples, but the present invention is by no means restricted thereto without departing from the intension and the scope of the present invention.

In the following examples, an infrared measurement, a $^1H/^{13}C$ NMR measurement, a polarization optical microscopy and a heat analysis (TG-DTA and DSC) were carried out by using the following devices.

[Measurement Devices]

Infrared (IR) spectrophotometer: FT-720, product of HORIBA, Ltd.

$^1$H/$^{13}$C NMR spectra: Bruker DPX300S

Polarization optical microscope/hot stage: OLYMPUS BX51/LINKAM LTS-350 (equipped with a temperature controller)

Heat analysis (TG-DTA): EXSTAR TG/DTA 6300, product of SII Nano technology Inc.

Heat analysis (DSC): DSC7 (air cooling), product of Perkin-Elmer

Further, in each of Examples, the following reagents were used.

[Reagents]

3,3',4,4'-Biphenyltetracarboxylic acid dianhydride (BPDA) and pyromellitic acid diianhydride represented by the following formula were purified by sublimation before use. N-Methyl pyrrolidone (NMP), acetonitrile and toluene were purified by distillation. As the other reagents and solvents, commercially available ones were used without purification.

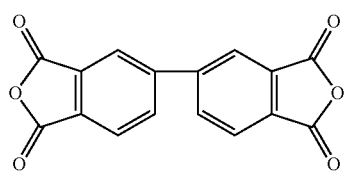

BPDA

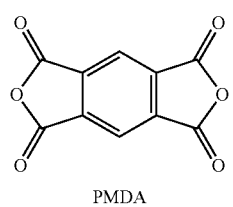

PMDA

Example 1

Synthesis of 4-(3-butenyloxy)nitrobenzene (1)

To an acetonitrile (20 mL) solution of 4-nitrophenol (0.423 g; 3.04 mmol) and potassium carbonate (1.11 g; 8.02 mmol), 4-bromo-1-butene (0.827 g; 6.13 mmol) was added, and the mixture was refluxed and then reacted for 17 hours. After completion of the reaction, the solution was filtrated by Celite, and then the filtrate was concentrated under a reduced pressure. The residue was purified by flash column chromatography using methylene chloride, and then the effluent was concentrated to obtain 4-(3-butenyloxy)nitrobenzene (1) (0.571 g, 97% of yield, a light yellow oil) represented by the following formula.

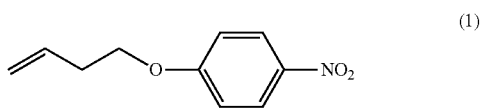

(1)

Various measurements were carried out with regard to the obtained 4-(3-butenyloxy)nitrobenzene (1), and results are shown below.

IR measurement result: (NaCl), v (cm$^{-1}$): 2942.8 (Alkyl C—H), 1643.1 (C=C), 1592.9 (Ar C—C), 1508.1, 1334.5 (—NO$_2$)

$^1$H NMR measurement result: (measurement condition: 300 MHz, CDCl$_3$, δ, ppm, 25° C.): 8.20 (d, J=9.3, ArH, 2H), 6.95 (d, J=9.0, ArH, 2H), 5.96-5.82 (m, vinyl proton, 1H), 5.23-5.12 (m, vinyl proton, 2H), 4.11 (t, J=6.6, —CH$_2$—, 2H), 2.62-2.55 (m, —CH$_2$—, 2H)

$^{13}$C NMR measurement result: (measurement condition: 75 MHz, CDCl$_3$, δ, ppm, 25° C.): 164.1, 141.5, 133.7, 125.9, 117.7, 114.5, 68.1, 33.4

Synthesis of 1,7-bis(4-nitrophenoxybutyl)-1,1,3,3,5,5,7,7-octamethyltetrasiloxane (2b)

To a solution of the above 4-(3-butenyloxy)nitrobenzene (1) (4.27 g; 22.1 mmol), 1,1,3,3,5,5,7,7-octamethyltetrasiloxane (2.97 g; 9.98 mmol) dissolved in 20 mL of toluene and Karsted catalyst (0.25 mL; a 2% xylene solution of platinum divinyl tetramethyldisiloxane complex) were added. The reaction solution was heated to reflux for 21 hours in a nitrogen atmosphere, and then subjected to a reduced pressure to remove toluene. The obtained materials were purified by column chromatography to obtain a light yellow oily material of 1,7-bis(4-nitrophenoxybutyl)-1,1,3,3,5,5,7,7-octamethyltetrasiloxane (2b) (5 g, 75% of yield) represented by the following formula.

Various measurements were carried out with regard to the obtained 1,7-bis(4-nitrophenoxybutyl)-1,1,3,3,5,5,7,7-octamethyltetrasiloxane (2b), and results are shown below.

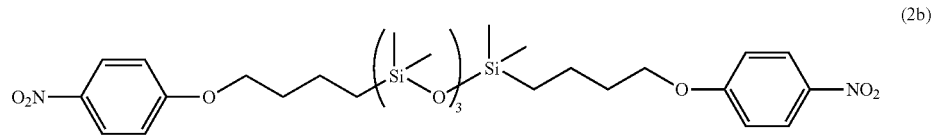

(2b)

IR measurement result: (NaCl), v (cm$^{-1}$): 2958.3 (Alkyl C—H), 1592.9 (Ar C—C), 1515.8, 1342.2 (—NO$_2$), 1261.2 (Si—C)

$^1$H NMR measurement result: (measurement condition: 300 MHz, CDCl$_3$, δ, ppm, 25° C.): 8.19 (d, J=9.3, ArH, 4H), 6.93 (d, J=9.3, ArH, 4H), 4.05 (t, J=6.3, —CH$_2$—, 4H), 1.89-1.80 (m, —CH$_2$—, 4H), 1.57-1.47 (m, —CH$_2$—, 4H), 0.63-0.57 (m, —CH$_2$—, 4H), 0.09 (s, Si—CH$_{3,12}$H), 0.04 (s, Si—CH$_3$, 12H)

$^{13}$C NMR measurement result: (measurement condition: 75 MHz, CDCl$_3$, δ, ppm, 25° C.): 164.4, 141.4, 126.0, 114.5, 68.6, 32.5, 19.8, 18.0, 1.34, 0.314

Synthesis of 1,7-bis(4-aminophenoxybutyl)-1,1,3,3,5,5,7,7-octamethyltetrasiloxane (3c)

2.26 g of the above 2b (3.38 mmol) and 15 mL of a 10 wt % Pd/C ethyl acetate solution (0.0209 g) were mixed, and stirred for 2 days in a hydrogen atmosphere at room temperature. The solution was filtrated by Celite and then concentrated to obtain a colorless oily material of 1,7-bis(4-aminophenoxybutyl)-1,1,3,3,5,5,7,7-octamethyltetrasiloxane (3c) (2.05 g, 99% of yield) represented by the following formula. Various measurements were carried out with regard to the obtained 1,7-bis(4-aminophenoxybutyl)-1,1,3,3,5,5,7,7-octamethyltetrasiloxane (3c), and results are shown below.

IR measurement result: (NaCl), v (cm$^{-1}$): 3359.4 (N—H), 2958.3 (Alkyl C—H), 1623.8 (N—H), 1511.9 (Ar C—C), 1238.1 (Si—C)

$^1$H NMR measurement result: (measurement condition: 300 MHz, CDCl$_3$, δ, ppm, 25° C.): 6.74 (d, J=9.0, ArH, 4H), 6.63 (d, J=9.0, ArH, 4H), 3.88 (t, J=6.3, —CH$_2$—, 4H), 3.39 (s, NH$_2$, 2H), 1.81-1.72 (m, —CH$_2$—, 4H), 1.54-1.43 (m, —CH$_2$—, 4H), 0.62-0.56 (m, —CH$_2$—, 4H), 0.08 (s, Si—CH$_3$, 12H), 0.04 (s, Si—CH$_3$, 12H)

$^{13}$C NMR measurement result: (measurement condition: 75 MHz, CDCl$_3$, δ, ppm, 25° C.): 152.5, 139.9, 116.5, 115.8, 68.4, 33.1, 19.9, 18.1, 1.35, 0.334

Synthesis of Liquid Crystal Polyimide (6h)

0.306 g (0.502 mmol) of the above diamine (3c) was dissolved in 2.5 mL of NMP, 0.148 g (0.503 mmol) of BPDA was added thereto, and then the solution was stirred for 1:2 hours at room temperature. The obtained polyamide acid was casted on a glass substrate in a nitrogen atmosphere, stepwise heated by a hot plate (heat imidization), and then finally heated at 200° C. to obtain a yellow film of liquid crystal polyimide (6h) represented by the following formula. Various measurements were carried out with regard to the obtained liquid crystal polyimide (6h), and results are shown below.

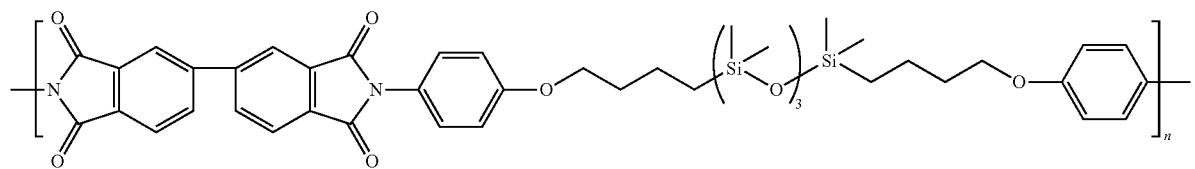

(6h)

IR measurement result: (Si wafer), v (cm$^{-1}$): 1770 (C=O), 1712 (C=O), 1389 (C—N)

<Heat Analysis and Polarization Optical Microscopy of Liquid Crystal Polyimide (6h)>

From the second scan results of DSC with a rate of the temperature rise and fall of 10° C./min, the following endotherm peak (T$_m$) and exotherm peak (T$_c$) were obtained.

T$_m$1 (crystal→liquid crystal phase transition): 222° C.; T$_m$2 (liquid crystal phase→isotropic phase transition): 268° C./T$_c$1: 254° C.; T$_c$2: 216° C.; T$_c$3: 203° C.

Further, by a polarization optical microscopy of liquid crystal polyimide (6h) at 240° C., an optical texture derived from a liquid crystal phase was observed. The picture

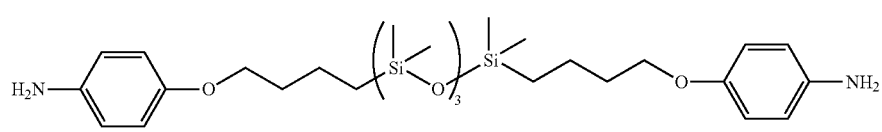

(3c)

obtained by the polarization optical microscopy is shown in FIG. 1. Further, the magnification of the picture is 400 times.

Example 2

Synthesis of 1,3-bis(4-nitrophenoxybutyl)-1,1,3,3,-tetramethyldisiloxane (2a)

By the same synthesis procedure as for 2b in Example 1,4-(3-butenyloxy) nitrobenzene (1) and 1,1,3,3-tetramethyldisiloxane were reacted to obtain 1,3-bis(4-nitrophenoxybutyl)-1,1,3,3-tetramethyldisiloxane (2a) (a yellow oily liquid (65% of yield)) represented by the following formula.

Various measurements were carried out with regard to 1,3-bis(4-nitrophenoxybutyl)-1,1,3,3-tetramethyldisiloxane (2a), and results are shown below.

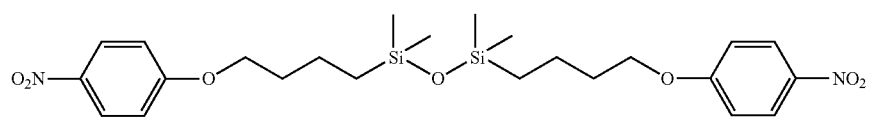

(2a)

IR measurement result: (NaCl), ν (cm$^{-1}$): 2950.6 (Alkyl C—H), 1592.9 (Ar C—C), 1515.8, 1338.4 (—NO$_2$), 1265.1 (Si—C)

$^1$H NMR measurement result: (measurement condition: 300 MHz, CDCl$_3$, δ, ppm, 25° C.): 8.19 (d, J=9.0, ArH, 4H), 6.93 (d, J=9.3, ArH, 4H), 4.04 (t, J=6.3, —CH$_2$—, 4H), 1.88-1.79 (m, —CH$_2$—, 4H), 1.54-1.45 (m, —CH$_2$—, 4H), 0.61-0.55 (m, —CH$_2$—, 4H), 0.06 (s, Si—CH$_3$, 12H)

$^{13}$C NMR measurement result: (measurement condition: 75 MHz, CDCl$_3$, δ, ppm, 25° C.): 164.3, 141.4, 126.0, 114.5, 68.6, 32.5, 19.9, 18.1, 0.503

(s, NH$_2$, 2H), 1.80-1.71 (m, —CH$_2$—, 4H), 1.54-1.42 (m, —CH$_2$—, 4H), 0.61-0.53 (m, —CH$_2$—, 4H), 0.05 (s, Si—CH$_3$, 12H)

$^{13}$C NMR measurement result: (measurement condition: 75 MHz, CDCl$_3$, δ, ppm, 25° C.): 152.5, 139.9, 116.5, 115.8, 68.4, 33.1, 20.0, 18.3, 0.510

Synthesis of Liquid Crystal Polyimide (6f)

By the same manner as for (6h) in Example 1, a polyamide acid was synthesized from the above (3a) and BPDA, casted on a glass substrate, and then subjected to heat imidization to obtain a turbid yellow film of liquid crystal polyimide (6f) represented by the following formula. Various measurements were carried out with regard to the obtained liquid crystal polyimide (6f), and results are shown below.

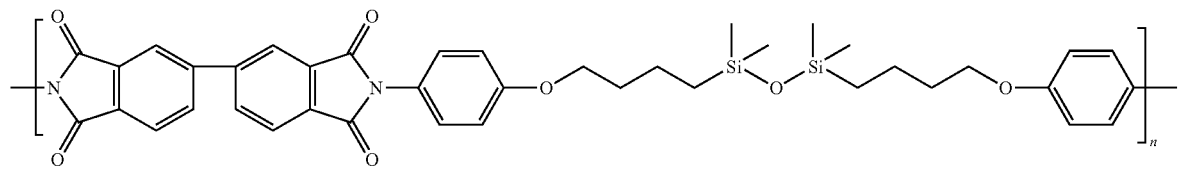

(6f)

Synthesis of 1,3-bis(4-aminophenoxybutyl)-1,1,3,3-tetramethyldisiloxane (3a)

By the same synthesis procedure as for (3c) in Example 1, the above (2a) was reduced to obtain 1,3-bis(4-aminophenoxybutyl)-1,1,3,3,-tetramethyldisiloxane (3a) (a light brown oily liquid (98% of yield)) represented by the following formula. Various measurements were carried out with regard to the obtained 1,3-bis(4-aminophenoxybutyl)-1,1,3, 3,-tetramethyldisiloxane (3a), and results are shown below.

IR measurement result: (Si wafer), ν (cm$^{-1}$): 1770 (C=O), 1712 (C=O), 1389 (C—N)

<Heat Analysis and Polarization Optical Microscopy of Liquid Crystal Polyimide (6f)>

From the second scan results of DSC with a rate of the temperature rise and fall of 10° C./min, the following endotherm peak (T$_m$) and exotherm peak (T$_c$) were obtained.

T$_m$1 (crystal liquid→crystal phase transition): 253° C.; T$_m$2 (liquid crystal phase→liquid crystal phase transition):

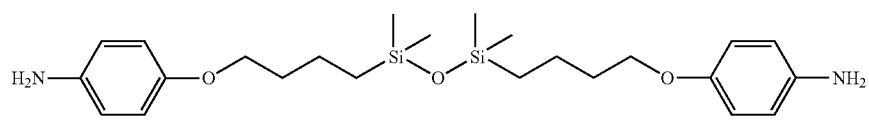

(3a)

IR measurement result: (NaCl), ν (cm$^{-1}$): 3355.5 (N—H), 2950.6 (Alkyl C—H), 1623.8 (N—H), 1511.9 (Ar C—C), 1238.1 (Si—C)

$^1$H NMR measurement result: (measurement condition: 300 MHz, CDCl$_3$, δ, ppm, 25° C.): 6.74 (d, J=9.0, ArH, 4H), 6.63 (d, J=9.0, ArH, 4H), 3.87 (t, J=6.3, —CH$_2$—, 4H), 3.40

264° C.; T$_m$3 (liquid crystal phase→isotropic phase transition): 335° C./T$_c$1: 325° C.; T$_c$2: 236° C.

Figure 2:
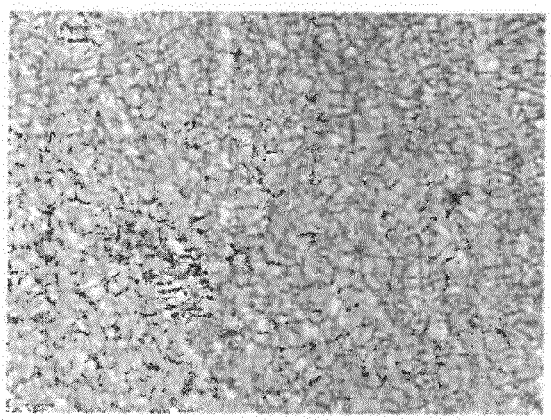
FIG. 2 is a polarization optical microscopy picture of the liquid crystal polyimide (6f) obtained in Example of the present invention.

By a polarization optical microscopy of liquid crystal polyimide (6f) at 320° C., an optical texture derived from a liquid crystal phase was observed. The picture obtained by the polarization optical microscopy is shown in FIG. 2. Further, the magnification of the picture is 400 times.

Example 3

Synthesis of Liquid Crystal Polyimide (6c)

By the same manner as for 6f in Example 2, a polyamide acid was synthesized from (3c) and PMDA, casted on a glass substrate, and then subjected to heat imidization to obtain a turbid yellow film of liquid crystal polyimide (6c) represented by the following formula.

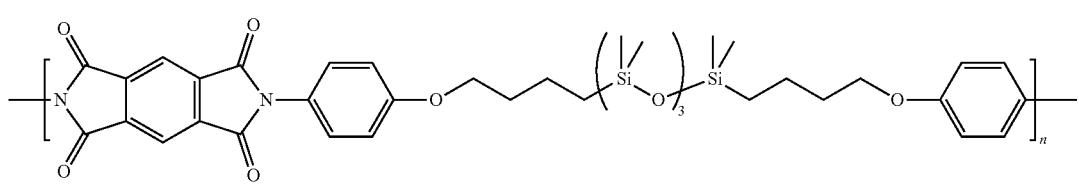

(6c)

<Heat Analysis and Polarization Optical Microscopy of Liquid Crystal Polyimide (6c)>

From the second scan results of DSC with a rate of the temperature rise and fall of 10° C./min, the following endotherm peak ($T_m$) and exotherm peak ($T_c$) were obtained.

$T_m1$ (crystal→liquid crystal phase transition): 236.8° C.; $T_m2$ (liquid crystal phase→isotropic phase transition): 249.6° C./$T_c1$: 231.0° C.; $T_c2$: 213.6° C.

Figure 3:
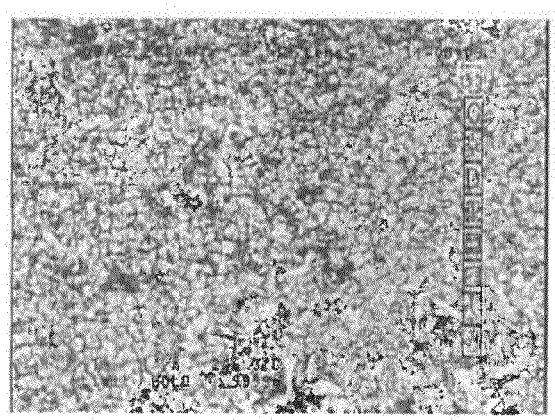
FIG. 3 is a polarization optical microscopy picture of the liquid crystal polyimide (6c) obtained in Example of the present invention.

By a polarization optical microscopy of liquid crystal polyimide (6c) at 250° C., an optical texture derived from a liquid crystal phase was observed. The picture obtained by the polarization optical microscopy is shown in FIG. 3. Further, the magnification of the picture is 400 times.

Reference Example 1

Synthesis of 4-(5-hexenyloxy)nitrobenzene (1b)

To an acetonitrile (40 mL) solution of 4-nitrophenol (2.79 g; 20.0 mmol) and potassium carbonate (4.15 g; 30.1 mmol), 6-bromo-1-hexene (4.01 g; 24.6 mmol) was added, and the mixture was refluxed and then reacted for 12 hours. After completion of the reaction, the solution was filtrated by Celite, and then the filtrate was concentrated under a reduced pressure. The residue was purified by flash column chromatography using methylene chloride, and then the effluent was concentrated to obtain 4-(5-hexenyloxy)nitrobenzene (1b) (4.11 g, 93% of yield, a light yellow oil) represented by the following formula.

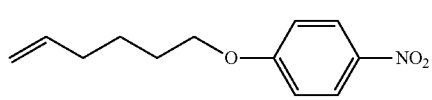

(1b)

Various measurements were carried out with regard to the obtained 4-(5-hexenyloxy)nitrobenzene (1b), and results are shown below.

IR measurement result: (NaCl), ν (cm$^{-1}$): 2942.8 (Alkyl C—H), 1639.2 (C=C), 1592.9 (Ar C—C), 1511.9, 1342.2 (—NO$_2$)

$^1$H NMR measurement result: (measurement condition: 300 MHz, CDCl$_3$, δ, ppm, 25° C.): 8.19 (d, J=9.3, ArH, 2H), 6.94 (d, J=9.3, ArH, 2H), 5.89-5.76 (m, vinyl proton, 1H), 5.08-4.97 (m, vinyl proton, 2H), 4.06 (t, J=6.5, —CH$_2$—, 2H), 2.14 (q, J=7.1, —CH$_2$—, 2H), 1.89-1.80 (m, —CH$_2$—, 2H), 1.63-1.49 (m, —CH$_2$—, 2H)

$^{13}$C NMR measurement result: (measurement condition: 75 MHz, CDCl$_3$, δ, ppm, 25° C.): 164.3, 141.4, 138.3, 126.0, 115.1, 114.5, 68.8, 33.4, 28.5, 25.3

Synthesis of 1,7-bis(4-nitrophenoxyhexyl)-1,1,3,3,5,5,7,7-octamethyltetrasiloxane (2d)

To 1,1,3,3,5,5,7,7-octamethyltetrasiloxane (1.53 g; 5.42 mmol) dissolved in 10 mL of toluene, the above 4-(5-hexenyloxy)nitrobenzene (1b) (3.32 g; 15.0 mmol) and Karsted catalyst (30 drops; a 2% xylene solution of platinum divinyl tetramethyldisiloxane complex) were added. The reaction solution was heated to reflux for 24 hours in a nitrogen atmosphere, and then subjected to a reduced pressure to remove toluene. The obtained material was purified by column chromatography using methylene chloride:hexane (4:6, volume ratio) to obtain a light yellow oily material of 1,7-bis(4-nitrophenoxyhexyl)-1,1,3,3,5,5,7,7-octamethyltetrasiloxane (2d) (3.79 g, 97% of yield) represented by the following formula.

Various measurements were carried out with regard to the obtained (2d), and results are shown below.

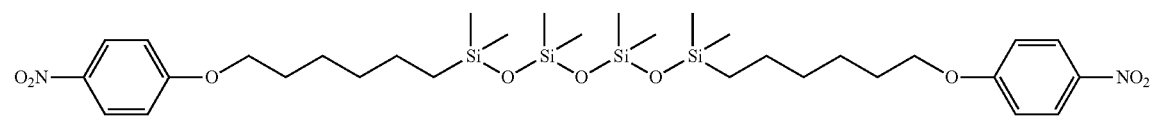

(2d)

IR measurement result: (NaCl), ν (cm$^{-1}$): 2923.6 (Alkyl C—H), 1592.9 (Ar C—C), 1515.8, 1342.2 (—NO$_2$), 1261.2 (Si—C)

$^1$H NMR measurement result: (measurement condition: 300 MHz, CDCl$_3$, δ, ppm, 25° C.): 8.19 (d, J=9.3, ArH, 4H), 6.93 (d, J=9.3, ArH, 4H), 4.04 (t, J=6.5, —CH$_2$—, 4H), 1.89-1.77 (m, —CH$_2$—, 4H), 1.53-1.33 (m, —CH$_2$—, 12H), 0.57-0.50 (m, —CH$_2$—, 4H), 0.07 (s, Si—CH$_3$, 12H), 0.04 (s, Si—CH$_3$, 12H)

$^{13}$C NMR measurement result: (measurement condition: 75 MHz, CDCl$_3$, δ, ppm, 25° C.): 164.6, 141.9, 126.2, 114.8, 69.3, 33.4, 29.3, 26.0, 23.5, 18.6, 1.56, 0.57

Synthesis of 1,7-bis(4-aminophenoxyhexyl)-1,1,3,3, 5,5,7,7-octamethyltetrasiloxane (3d)

2.71 g of the above (2d) (3.73 mmol) and 15 mL of a 10 wt % Pd/C ethyl acetate solution (0.0150 g) were mixed, and stirred for 2 days in a hydrogen atmosphere at room temperature. The solution was filtrated by Celite, and then concentrated to obtain a colorless oily material of 1,7-bis(4-aminophenoxyhexyl)-1,1,3,3,5,5,7,7-octamethyltetrasiloxane (3d) (2.47 g, 99% of yield) represented by the following formula. Various measurements were carried out with regard to the obtained (3d), and results are shown below.

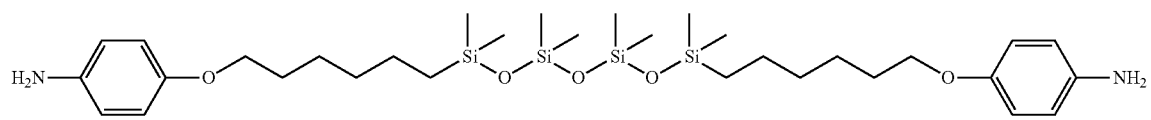

(3d)

IR measurement result: (NaCl), ν (cm$^{-1}$): 3359.4 (N—H), 2923.6 (Alkyl C—H), 1623.8 (N—H), 1511.9 (Ar C—C), 1238.1 (Si—C)

$^1$H NMR measurement result: (measurement condition: 300 MHz, CDCl$_3$, δ, ppm, 25° C.): 6.74 (d, J=9.3, ArH, 4H), 6.63 (d, J=8.7, ArH, 4H), 3.87 (t, J=6.6, —CH$_2$—, 4H), 3.40 (s, NH$_2$, 2H), 1.78-1.68 (m, —CH$_2$—, 4H), 1.54-1.32 (m, —CH$_2$—, 12H), 0.57-0.51 (m, —CH$_2$—, 4H), 0.06 (s, Si—CH$_3$, 12H), 0.04 (s, Si—CH$_3$, 12H)

$^{13}$C NMR measurement result: (measurement condition: 75 MHz, CDCl$_3$, δ, ppm, 25° C.): 152.5, 139.9, 116.5, 115.8, 68.8, 33.3, 29.5, 25.9, 23.3, 18.4, 1.36, 0.347

Synthesis of Polyimide (6d)

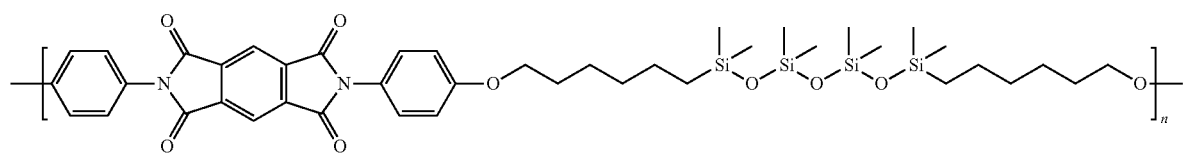

(6d)

1.09 g (1.64 mmol) of 1,7-bis(4-aminophenoxyhexyl)-1,1, 3,3,5,5,7,7-octamethyltetrasiloxane (3d) was dissolved in 8.20 g of NMP, 0.357 g (1.64 mmol) of PMDA was added thereto, and then the solution was stirred for 12 hours at room temperature. The obtained polyamide acid was casted on a glass substrate in a nitrogen atmosphere, stepwise heated by a hot plate (heat imidization), and then finally heated at 200° C. to obtain a film of polyimide (6d) represented by the above formula.

Various measurements were carried out with regard to the obtained polyimide (6d), and results are shown below.

IR measurement result: (Si wafer), ν (cm$^{-1}$): 2958 (Alkyl C—H), 1782 (C=O), 1724 (C=O), 1400 (C—N), 1254 (Si—C). Anal. Calcd. For C$_{42}$H$_{58}$N$_2$: C, 59.54; H, 6.90; N, 3.31. Found: C, 59.37; H, 6.80; N, 3.05

Reference Example 2

Synthesis of 4-(3-butenyloxy)-2-methylnitrobenzene (1c)

To an acetonitrile (50 mL) solution of 2-methyl-4-nitrophenol (3.05 g; 19.9 mmol) and potassium carbonate (4.27 g; 30.9 mmol), 4-bromo-1-butene (4.02 g; 29.8 mmol) was added, and the mixture was refluxed and then reacted for 12 hours. After completion of the reaction, the solution was filtrated by Celite, and then filtrate was concentrated under a reduced pressure. The residue was purified by flash column chromatography using methylene chloride, and then the effluent was concentrated to obtain 4-(3-butenyloxy)-2-methylnitrobenzene (1c) (2.61 g, 63% of yield, a light yellow oil) represented by the following formula.

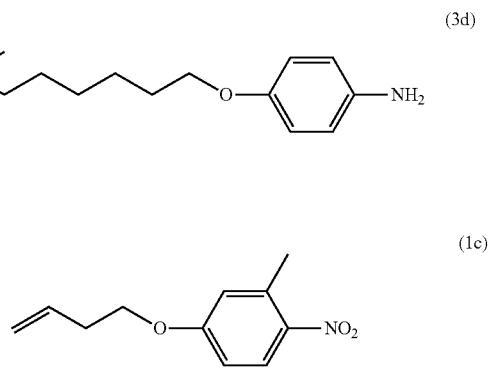

(1c)

Various measurements were carried out with regard to the obtained 4-(3-butenyloxy)-2-methylnitrobenzene (1c), and results are shown below.

IR measurement result: IR (NaCl), ν (cm$^{-1}$): 2935 (Alkyl C—H), 1643 (C=C), 1581 (Ar C—C), 1512, 1338 (—NO$_2$)

$^1$H NMR measurement result: (measurement condition: 300 MHz, CDCl$_3$, δ, ppm, 25° C.): 8.08 (d, J=9.9, ArH, 1H), 6.81-6.78 (m, ArH, 2H), 5.95-5.82 (m, vinyl proton, 1H), 5.22-5.11 (m, vinyl proton, 2H), 4.08 (t, J=6.9, —CH$_2$—, 2H), 2.62 (s, —CH$_3$, 3H), 2.61-2.53 (m, —CH$_2$—, 2H)

$^{13}$C NMR measurement result: (measurement condition: 75 MHz, CDCl$_3$, δ, ppm, 25° C.): 162.5, 142.2, 137.2, 133.8, 127.7, 118.1, 117.7, 112.3, 67.9, 33.5, 21.8

Synthesis of 1,7-bis[4-(3-methyl-4-nitrophenoxy) butyl]-1,1,3,3,5,5,7,7-octamethyltetrasiloxane (2e)

To 1,1,3,3,5,5,7,7-octamethyltetrasiloxane (1.44 g; 5.09 mmol) dissolved in 12 mL of toluene, the above 4-(3-butenyloxy)-2-methylnitrobenzene (1c) (2.37 g; 11.4 mmol) and Karsted catalyst (20 drops; a 2% xylene solution of platinum divinyl octamethyldisiloxane complex) were added. The reaction solution was heated to reflux for 24 hours in a nitrogen atmosphere, and then subjected to a reduced pressure to remove toluene. The obtained material was purified by column chromatography using methylene chloride:hexane (4:6, volume ratio) to obtain a light yellow oily material of 1,7-bis[4-(3-methyl-4-nitrophenoxy)butyl]-1,1,3,3,5,5,7,7-octamethyltetrasiloxane (2e) (3.05 g, 86% of yield) represented by the following formula.

Various measurements were carried out with regard to the obtained (2e), and results are shown below.

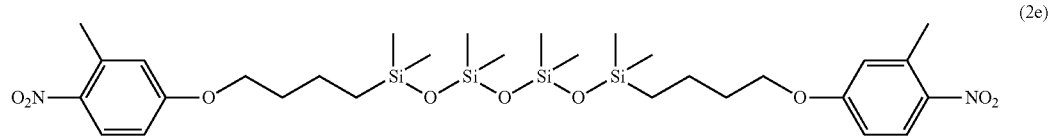 [SMILES: Cc1cc(OCCCC[Si](C)(C)O[Si](C)(C)O[Si](C)(C)O[Si](C)(C)CCCCOc2ccc([N+](=O)[O-])c(C)c2)ccc1[N+](=O)[O-]]

IR measurement result: (NaCl), ν (cm$^{-1}$): 2958.3 (Alkyl C—H), 1581.3 (Ar C—C), 1511.9, 1338.4 (—NO$_2$), 1257.36 (Si—C)

$^1$H NMR measurement result: (measurement condition: 300 MHz, CDCl$_3$, δ, ppm, 25° C.): 8.07 (d, J=9.3, ArH, 2H), 6.79-6.76 (m, ArH, 4H), 4.02 (t, J=6.5, —CH$_2$—, 4H), 2.62 (s, —CH$_3$, 6H), 1.87-1.78 (m, —CH$_2$—, 4H), 1.57-1.46 (m, —CH$_2$—, 4H), 0.63-0.57 (m, —CH$_2$—, 4H), 0.09 (s, Si—CH$_3$, 12H), 0.05 (s, Si—CH$_3$, 12H)

$^{13}$C NMR measurement result: (measurement condition: 75 MHz, CDCl$_3$, δ, ppm, 25° C.): 162.9, 142.1, 137.2, 127.7, 118.0, 112.3, 68.4, 32.6, 21.9, 19.8, 18.0, 1.36, 0.329

Element analysis measurement result: Anal. Calcd. For C$_{30}$H$_{52}$N$_2$: C, 51.69; H, 7.52; N, 4.02. Found: C, 51.52; H, 7.28; N, 3.83

Synthesis of 1,7-bis[4-(4-amino-3-methylphenoxy)butyl]-1,1,3,3,5,5,7,7-octamethyltetrasiloxane (3e)

2.62 g of the above 2e (3.76 mmol) and 10 mL of a 10 wt % Pd/C ethyl acetate solution (0.0230 g) were mixed, and stirred for 2 days in a hydrogen atmosphere at room temperature. The solution was filtrated by Celite and then concentrated to obtain a colorless oily material of 1,7-bis[4-(4-amino-3-methylphenoxy)butyl]-1,1,3,3,5,5,7,7-octamethyltetrasiloxane (3e) (2.38 g, 99% of yield) represented by the following formula. Various measurements were carried out with regard to the obtained (3e), and results are shown below.

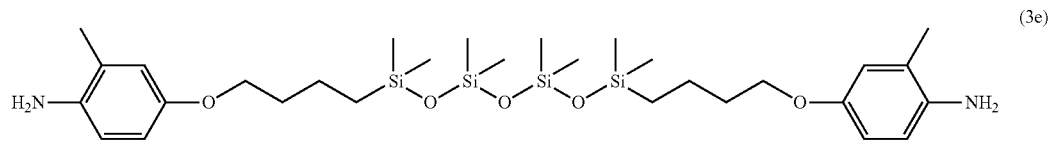 [SMILES: Cc1cc(OCCCC[Si](C)(C)O[Si](C)(C)O[Si](C)(C)O[Si](C)(C)CCCCOc2ccc(N)c(C)c2)ccc1N]

IR measurement result: (NaCl), ν (cm$^{-1}$): 3363.3 (N—H), 2935.1 (Alkyl C—H), 1608.3 (N—H), 1504.2 (Ar C—C), 1238.1 (Si—C)

$^1$H NMR measurement result: (measurement condition: 300 MHz, CDCl$_3$, δ, ppm, 25° C.): 6.67-6.60 (m, ArH, 6H), 3.87 (t, J=6.5, —CH$_2$—, 4H), 3.33 (s, NH$_2$, 4H), 2.15 (s, —CH$_3$, 6H), 1.81-1.71 (m, —CH$_2$—, 4H), 1.53-1.43 (m, —CH$_2$—, 4H), 0.62-0.56 (m, —CH$_2$—, 4H), 0.08 (s, Si—CH$_3$, 12H), 0.04 (s, Si—CH$_3$, 12H)

$^{13}$C NMR measurement result: (measurement condition: 75 MHz, CDCl$_3$, δ, ppm, 25° C.): 152.4, 138.1, 124.1, 117.4, 116.1, 113, 1, 68.4, 33.2, 20.0, 18.1, 17.8, 1.36, 0.334

Synthesis of Polyimide (6e)

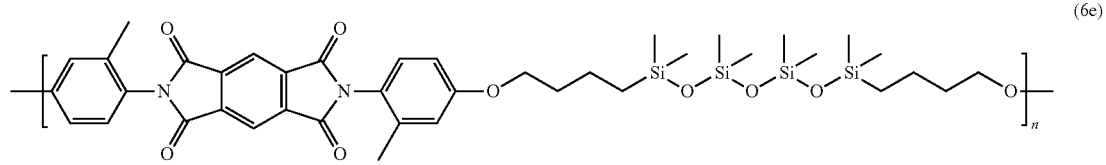

1.23 g (1.93 mmol) of 1,7-bis[4-(4-amino-3-methylphenoxy)butyl]-1,1,3,3,5,5,7,7-octamethyltetrasiloxane (3e) was dissolved in 9.34 g of NMP, 0.420 g (1.93 mmol) of PMDA was added thereto, and then the solution was stirred for 12 hours at room temperature. The obtained polyamide acid was casted on a glass substrate in a nitrogen atmosphere, stepwise heated by a hot plate (heat imidization), and then finally heated at 200° C. to obtain a film of polyimide (6e) represented by the above formula. Various measurements were carried out with regard to the obtained (6e), and results are shown below.

IR measurement result: (Si wafer), v (cm$^{-1}$): 2958 (Alkyl C—H), 1774 (C=O), 1720 (C=O), 1381 (C—N), 1254 (Si—C). Anal. Calcd. For $C_{40}H_{54}N_2$: C, 58.65; H, 6.64; N, 3.42. Found: C, 58.38; H, 6.65; N, 3.06

Reference Example 3

Synthesis of Polyimide (6j)

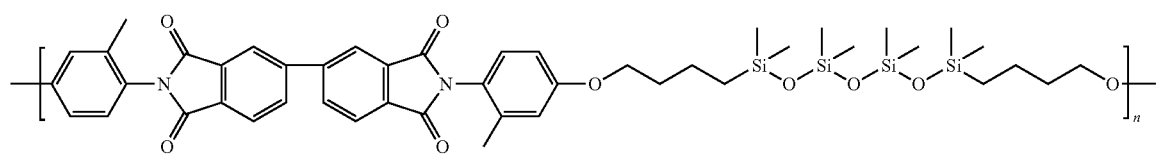

0.896 g (1.41 mmol) of 1,7-bis[4-(4-amino-3-methylphenoxy)butyl]-1,1,3,3,5,5,7,7-octamethyltetrasiloxane (3e) was dissolved in 7.41 g of NMP, 0.414 g (1.41 mmol) of BPDA was added thereto, and thus obtained solution was stirred for 12 hours at room temperature. The obtained polyamide acid was casted on a glass substrate in a nitrogen atmosphere, stepwise heated by a hot plate (heat imidization), and then finally heated at 200° C. to obtain a film of polyimide (6j). Various measurements were carried out with regard to the obtained (6j), and results are shown below.

IR measurement result: (Si wafer), v (cm$^{-1}$): 2958 (Alkyl C—H), 1774 (C=O), 1720 (C=O), 1381 (C—N), 1254 (Si—C). Anal. Calcd. For $C_{46}H_{58}N_2$: C, 61.71; H, 6.53; N, 3.13. Found: C, 61.56; H, 6.49; N, 2.83

Reference Example 4

Synthesis of 1,3-bis[4-(4-nitrophenoxy)butyl]-1,1,3,3-tetramethyldisiloxane (2a)

To 1,1,3,3-tetramethyldisiloxane (0.125 g; 0.934 mmol) dissolved in 3 mL of toluene, 4-(3-butenyloxy)nitrobenzene (0.519 g; 2.69 mmol) and Karsted catalyst (3 drops; a 2% xylene solution of platinum divinyl tetramethyldisiloxane complex) were added. The reaction solution was heated to reflux for 24 hours in a nitrogen atmosphere, and then subjected to a reduced pressure to remove toluene. The obtained material was purified by column chromatography using methylene chloride:hexane (4:6, volume ratio) to obtain a light yellow oily material 1,3-bis[4-(4-nitrophenoxy)butyl]-1,1,3,3-tetramethyldisiloxane (2a) (0.312 g, 65% of yield) represented by the following formula.

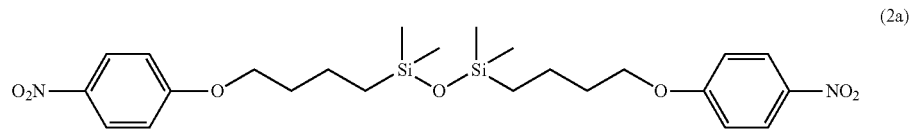

IR measurement result: (NaCl), v (cm$^{-1}$): 2950.6 (Alkyl C—H), 1592.9 (Ar C—C), 1515.8, 1338.4 (—NO$_2$), 1265.1 (Si—C)

$^1$H NMR measurement result: (300 MHz, CDCl$_3$, δ, ppm, 25° C.): 8.19 (d, J=9.0, ArH, 4H), 6.93 (d, J=9.3, ArH, 4H), 4.04 (t, J=6.3, —CH$_2$—, 4H), 1.88-1.79 (m, —CH$_2$—, 4H), 1.54-1.45 (m, —CH$_2$—, 4H), 0.61-0.55 (m, —CH$_2$—, 4H), 0.06 (s, Si—CH$_3$, 12H)

$^{13}$C NMR measurement result: (75 MHz, CDCl$_3$, δ, ppm, 25° C.): 164.3, 141.4, 126.0, 114.5, 68.6, 32.5, 19.9, 18.1, 0.503. Anal. Calcd. For $C_{24}H_{36}N_2$: C, 55.36; H, 6.97; N, 5.38. Found: C, 55.10; H, 6.91; N, 5.23

Synthesis of 1,3-bis[4-(4-aminophenoxy)butyl]-1,1,3,3-tetramethyldisiloxane (3a)

1,3-bis[4-(4-nitrophenoxy)butyl]-1,1,3,3-tetramethyldisiloxane (2a) (1.35 g; 3.38 mmol) and 10 mL of a 10 wt % Pd/C (0.0393 g) ethyl acetate solution were mixed, and stirred for 2 days in a hydrogen atmosphere at room temperature. The solution was filtrated by Celite and then concentrated to obtain a colorless oily material (1.18 g, 98% of yield).

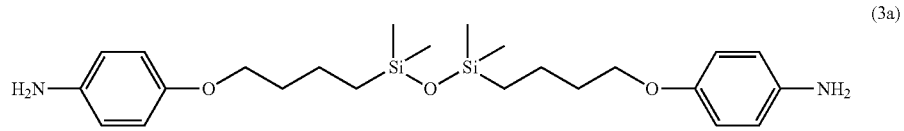

(3a)

IR measurement result: (NaCl), v (cm$^{-1}$): 3355.5 (N—H), 2950.6 (Alkyl C—H), 1623.8 (N—H), 1511.9 (Ar C—C), 1238.1 (Si—C)

$^1$H NMR measurement result: (300 MHz, CDCl$_3$, δ, ppm, 25° C.): 6.74 (d, J=9.0, ArH, 4H), 6.63 (d, J=9.0, ArH, 4H), 3.87 (t, J=6.3, —CH$_2$—, 4H), 3.40 (s, NH$_2$, 4H), 1.80-1.71 (m, —CH$_2$—, 4H), 1.54-1.42 (m, —CH$_2$—, 4H), 0.61-0.53 (m, —CH$_2$—, 4H), 0.05 (s, Si—CH$_3$, 12H)

$^{13}$C NMR measurement result: (75 MHz, CDCl$_3$, δ, ppm, 25° C.): 152.5, 139.9, 116.5, 115.8, 68.4, 33.1, 20.0, 18.3, 0.510

Synthesis of Polyimide (6a)

0.258 g (0.561 mmol) of 1,3-bis[4-(4-aminophenoxy)butyl]-1,1,3,3-tetramethyldisiloxane was dissolved in 2.15 g of NMP, 0.122 g (0.559 mmol) of PMDA was added thereto, and thus obtained solution was stirred for 12 hours at room temperature. The obtained polyamide acid was casted on a glass substrate in a nitrogen atmosphere, stepwise heated by a hot plate (heat imidization), and then finally heated at 200° C. to obtain a turbid yellow film of polyimide (6a).

IR measurement result: (Si wafer), v (cm$^{-1}$): 2954 (Alkyl C—H), 1782 (C=O), 1724 (C=O), 1400 (C—N), 1254 (Si—C). Anal. Calcd. For C$_{34}$H$_{38}$N$_2$: C, 63.52; H, 5.96; N, 4.36. Found: C, 63.13; H, 6.00; N, 4.16

Example 4

Synthesis of 1,5-bis[4-(4-nitrophenoxy)butyl]-1,1,3,3,5,5-hexamethyltrisiloxane (2c)

To 1,1,3,3,5,5-hexamethyltrisiloxane (2.10 g; 10.1 mmol) dissolved in 20 mL of toluene, 4-(3-butenyloxy)nitrobenzene (5.11 g; 26.4 mmol) and Karsted catalyst (30 drops; a 2% xylene solution of platinum divinyl tetramethyldisiloxane complex) were added. The reaction solution was heated to reflux for 24 hours in a nitrogen atmosphere, and then subjected to a reduced pressure to remove toluene. The obtained material was purified by column chromatography using methylene chloride:hexane (4:6, volume ratio) to obtain a light yellow oily material (5.68 g, 95% of yield) represented by the following formula.

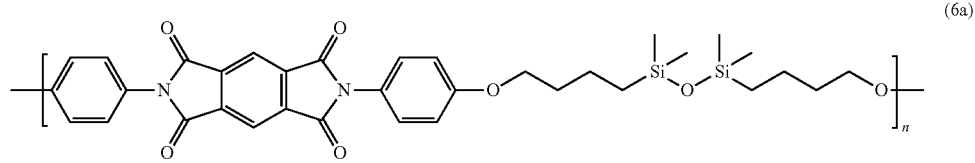

(6a)

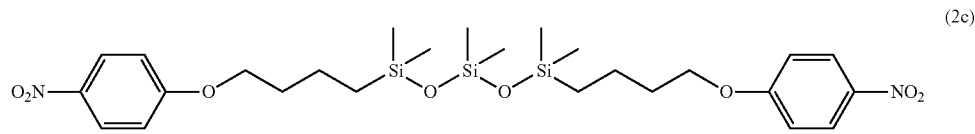 [SMILES: C[Si](C)(CCCCOc1ccc([N+](=O)[O-])cc1)O[Si](C)(C)O[Si](C)(C)CCCCOc1ccc([N+](=O)[O-])cc1]

(2c)

IR measurement result: (NaCl), v (cm$^{-1}$): 2954.4 (Alkyl C—H), 1592.9 (Ar C—C), 1515.8, 1338.4 (—NO$_2$), 1261.2 (Si—C)

$^1$H NMR measurement result: (300 MHz, CDCl$_3$, δ, ppm, 25° C.): 8.19 (d, J=9.3, ArH, 4H), 6.93 (d, J=9.0, ArH, 4H), 4.04 (t, J=6.3, —CH$_2$—, 4H), 1.89-1.80 (m, —CH$_2$—, 4H), 1.57-1.46 (m, —CH$_2$—, 4H), 0.62-0.57 (m, —CH$_2$—, 4H), 0.08 (s, Si—CH$_3$, 12H), 0.03 (s, Si—CH$_3$, 6H)

$^{13}$C NMR measurement result: (75 MHz, CDCl$_3$, δ, ppm, 25° C.): 164.4, 141.4, 126.0, 114.5, 68.6, 32.5, 19.8, 18.0, 1.42, 0.315. Anal. Calcd. For C$_{26}$H$_{42}$N$_2$: C, 52.49; H, 7.12; N, 4.71. Found: C, 52.88; H, 6.95; N, 4.71

Synthesis of 1,5-bis[4-(4-aminophenoxy)butyl]-1,1,3,3,5,5-hexamethyltrisiloxane (3b)

1,5-bis[4-(4-nitrophenoxy)butyl]-1,1,3,3,5,5-hexamethyltrisiloxane (2.79 g; 4.69 mmol) (2c) and 15 mL of a 10 wt % Pd/C (0.0262 g) ethyl acetate solution was mixed, and stirred for 2 days in a nitrogen atmosphere at room temperature. The solution was filtrated by Celite and then concentrated to obtain a colorless oily material of 1,5-bis[4-(4-aminophenoxy)butyl]-1,1,3,3,5,5-hexamethyltrisiloxane (3b) (2.48 g, 99% of yield) represented by the following formula.

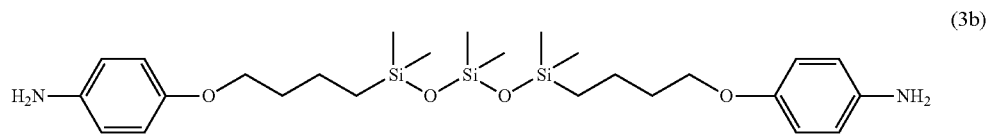 [SMILES: C[Si](C)(CCCCOc1ccc(N)cc1)O[Si](C)(C)O[Si](C)(C)CCCCOc1ccc(N)cc1]

(3b)

IR measurement result: (NaCl), v (cm$^{-1}$): 3359.4 (N—H), 2954.4 (Alkyl C—H), 1623.8 (N—H), 1511.9 (Ar C—C), 1238.1 (Si—C)

$^1$H NMR measurement result: (300 MHz, CDCl$_3$, δ, ppm, 25° C.): 6.74 (d, J=8.7, ArH, 4H), 6.63 (d, J=9.0, ArH, 4H), 3.87 (t, J=6.3, —CH$_2$—, 4H), 3.39 (s, NH$_2$, 4H), 1.81-1.71 (m, —CH$_2$—, 4H), 1.54-1.43 (m, —CH$_2$—, 4H), 0.61-0.55 (m, —CH$_2$—, 4H), 0.07 (s, Si—CH$_3$, 12H), 0.02 (s, Si—CH$_3$, 6H)

$^{13}$C NMR measurement result: (75 MHz, CDCl$_3$, δ, ppm, 25° C.): 152.5, 139.9, 116.5, 115.7, 68.4, 33.1, 19.9, 18.1, 1.45, 0.344

Synthesis of Liquid Crystal Polyimide (6b)

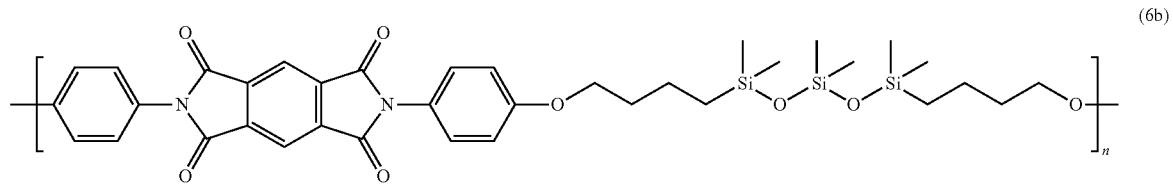

(6b)

0.899 g (1.68 mmol) of 1,5-bis[4-(4-aminophenoxy)butyl]-1,1,3,3,5,5-hexamethyltrisiloxane (3b) was dissolved in 7.15 g of NMP, 0.366 g (1.68 mmol) of PMDA was added thereto, and thus obtained solution was stirred for 12 hours at room temperature. The obtained polyamide acid was casted on a glass substrate in a nitrogen atmosphere, stepwise heated by a hot plate (heat imidization), and then finally heated at 200° C. to obtain a turbid yellow film of liquid crystal polyimide (6b).

IR measurement result: (Si wafer), v (cm$^{-1}$): 2958 (Alkyl C—H), 1782 (C=O), 1724 (C=O), 1400 (C—N), 1254 (Si—C). Anal. Calcd. For $C_{36}H_{44}N_2$: C, 60.30; H, 6.19; N, 3.91. Found: C, 60.11; H, 6.14; N, 3.75

Example 5

Synthesis of Liquid Crystal Polyimide (6g)

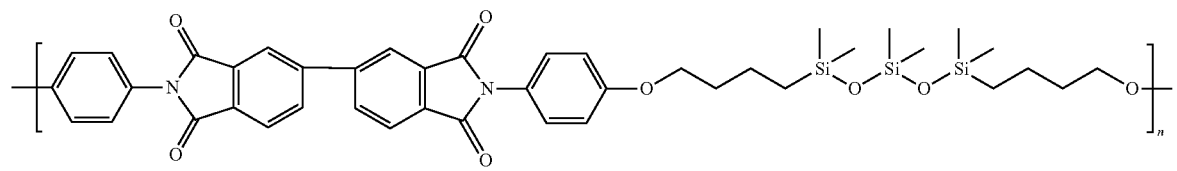

(6g)

1.09 g (2.04 mmol) of 1,5-bis[4-(4-aminophenoxy)butyl]-1,1,3,3,5,5-hexamethyltrisiloxane (3b) was dissolved in 9.54 g of NMP, 0.599 g (2.04 mmol) of BPDA was added thereto, and thus obtained solution was stirred for 12 hours at room temperature. The obtained polyamide acid was casted on a glass substrate in a nitrogen atmosphere, stepwise heated by a hot plate (heat imidization), and then finally heated at 200° C. to obtain a turbid yellow film of liquid crystal polyimide (6g).

IR measurement result: (Si wafer), v (cm$^{-1}$): 2954 (Alkyl C—H), 1770 (C=O), 1716 (C=O), 1389 (C—N), 1254 (Si—C). Anal. Calcd. For $C_{40}H_{42}N_2$: C, 66.82; H, 5.89; N, 3.90. Found: C, 66.58; H, 5.96; N, 3.74

Example 6

Synthesis of Liquid Crystal Polyimide (6l)

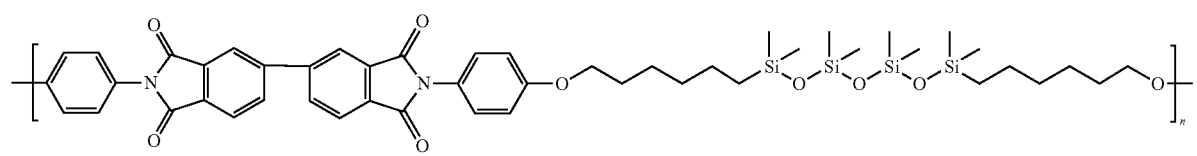

(6i)

0.994 g (1.49 mmol) of 1,7-bis[4-(4-aminophenoxy)hexyl]-1,1,3,3,5,5,7,7-octamethyltetrasiloxane (3d) was dissolved in 9.54 g of NMP, 0.439 g (1.49 mmol) of BPDA was added thereto, and thus obtained solution was stirred for 12 hours at room temperature. The obtained polyamide acid was casted on a glass substrate in a nitrogen atmosphere, stepwise heated by a hot plate (heat imidization), and then finally heated at 200° C. to obtain a turbid yellow film of liquid crystal polyimide (6l).

IR measurement result: (Si wafer), v (cm$^{-1}$): 2958 (Alkyl C—H), 1770 (C=O), 1712 (C=O), 1389 (C—N), 1254 (Si—C). Anal. Calcd. For $C_{48}H_{62}N_2$: C, 62.44; H, 6.77; N, 3.03. Found: C, 62.01; H, 6.65; N, 2.77

[Results]

The following chemical reaction formula is a reaction pathway for the polyimides synthesized in the above-described Examples 1 to 6 and Reference Examples 1 to 4.

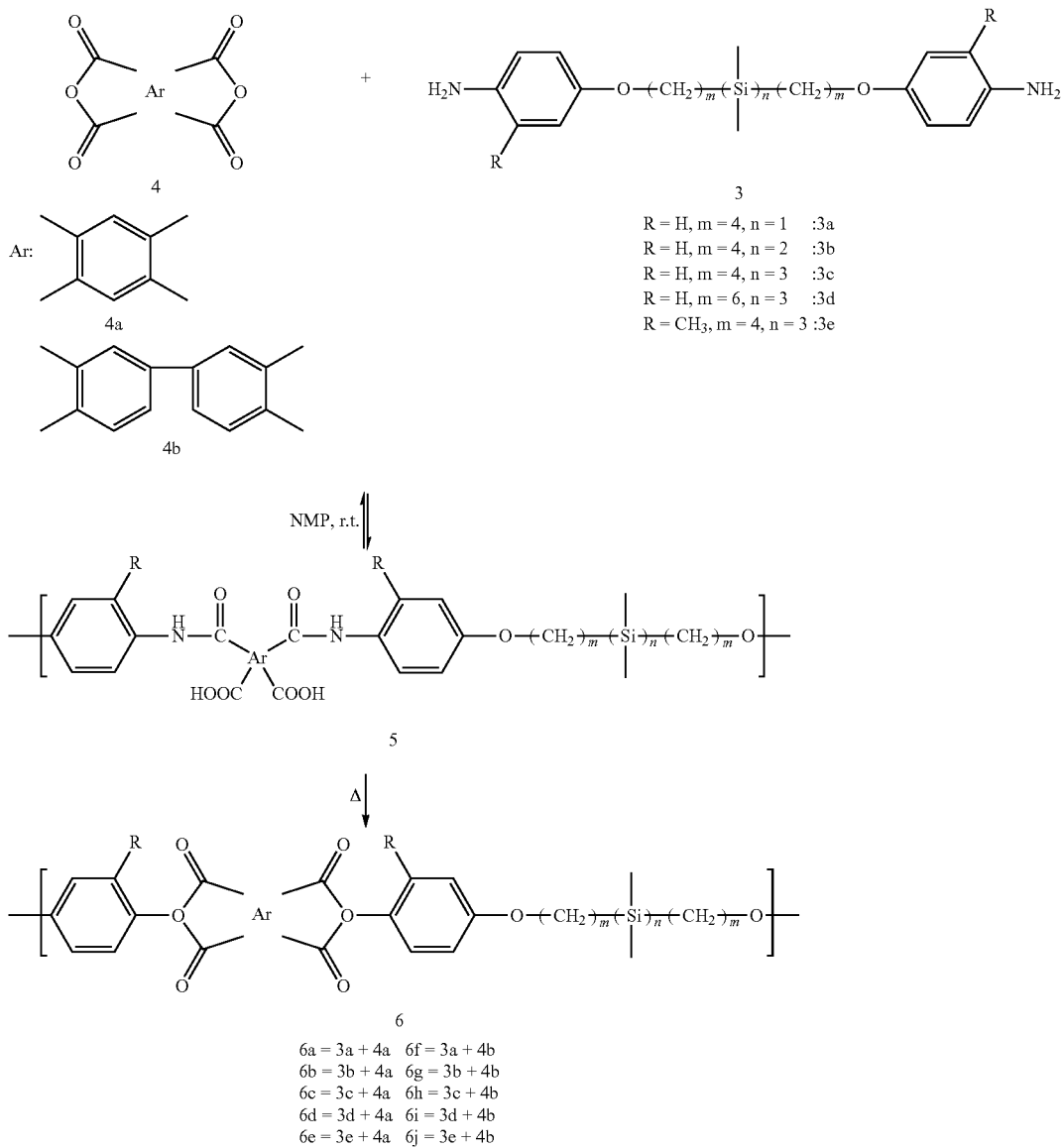

R = H, m = 4, n = 1  :3a
R = H, m = 4, n = 2  :3b
R = H, m = 4, n = 3  :3c
R = H, m = 6, n = 3  :3d
R = CH₃, m = 4, n = 3  :3e

6a = 3a + 4a   6f = 3a + 4b
6b = 3b + 4a   6g = 3b + 4b
6c = 3c + 4a   6h = 3c + 4b
6d = 3d + 4a   6i = 3d + 4b
6e = 3e + 4a   6j = 3e + 4b

The phase transition temperatures of the polyimides synthesized in Examples 1 to 6 and Reference Examples 1 to 4 are shown in the following Table 1.

TABLE 1

| Polyimide | Ar | R | m | n | $T_{cr\text{-}lc}$ [°C.]$^a$ | $T_{lc\text{-}lc}$ [°C.]$^a$ | $T_{lc\text{-}i}$ [°C.]$^a$ |
|---|---|---|---|---|---|---|---|
| Ex. 1 | 6h | 4b | H | 4 | 3 | 203 | 216 | 254 |
| Ex. 2 | 6f | 4b | H | 4 | 1 | 236 | —$^c$ | 325 |
| Ex. 3 | 6c | 4a | H | 4 | 3 | 214 | —$^c$ | 231 |
| Ref. Ex. 1 | 6d | 4a | H | 6 | 3 | —$^d$ | —$^d$ | —$^d$ |
| Ref. Ex. 2 | 6e | 4a | CH₃ | 4 | 3 | —$^e$ | —$^e$ | —$^e$ |
| Ref. Ex. 3 | 6j | 4b | CH₃ | 4 | 3 | —$^e$ | —$^e$ | —$^e$ |
| Ref. Ex. 4 | 6a | 4a | H | 4 | 1 | —$^b$ | —$^b$ | —$^b$ |
| Ex. 4 | 6b | 4a | H | 4 | 2 | 257 | —$^c$ | 300 |
| Ex. 5 | 6g | 4b | H | 4 | 2 | 236 | 262 | 297 |
| Ex. 6 | 6i | 4b | H | 6 | 3 | 211 | 219 | 265 |

$^a$ means that a peak temperature was observed by using DSC at the time of the second cooling with a cooling rate of 10° C./min.
$T_{cr\text{-}lc}$ indicates crystal phase → liquid crystal phase transition temperature.
$T_{lc\text{-}lc}$ indicates liquid crystal phase → liquid crystal phase transition temperature.
$T_{lc\text{-}i}$ indicates liquid crystal phase → isotropic phase transition temperature.
$^b$ means that a liquid crystal phase was not observed by POM since the phase transition temperature was higher than 330° C.
$^c$ means that liquid crystal phase → liquid crystal phase transition temperature was not observed,
$^d$ means that there was no liquid crystal phase. (Isotropic phase → crystal phase transition temperature $T_{i\text{-}cr}$ at the second temperature fall was found to be 258° C.)
$^e$ Physical properties of polyimide crystal (6e) at the second temperature rise: $T_g$ = 79 [° C.], $T_c$ = 117 [° C.], $T_m$ = 179 [° C.]; amorphous polyimide (6j) $T_g$ = 91 [° C.] ($T_g$: glass transition temperature, $T_c$: crystallization temperature, $T_m$: melting temperature)
* Ar, R, m and n in the above Table correspond to Ar, R, m and n in the above chemical reaction formula, respectively.
* "—" indicates that no transition was observed.
* Since polyimides having no crystallinity do not have all of the above-described phase transition temperatures, a value such as observed $T_g$ is shown above.

Example 7

Synthesis of 4-(3-butenyloxy)-3-fluoronitrobenzene (1d)

To an acetonitrile (40 mL) solution of 2-fluoro-4-nitrophenol (2.36 g; 15.1 mmol) and potassium carbonate (2.77 g; 20.1 mmol), 4-bromo-1-butene (2.81 g; 20.4 mmol) was added, and the mixture was refluxed and then reacted for 16 hours. After completion of the reaction, the solution was filtrated by Celite, and then the filtrate was concentrated under a reduced pressure. The residue was purified by flash column chromatography using methylene chloride, and then the effluent was concentrated to obtain 4-(3-butenyloxy)-3-fluoronitrobenzene (1d) (2.57 g, 81% of yield, a light yellow oil) represented by the following formula.

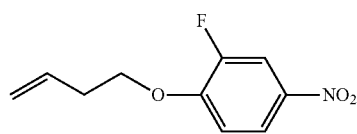

(1d)

Various measurements were carried out with regard to the obtained 4-(3-butenyloxy)-3-fluoronitrobenzene (1d), and results are shown below.

IR measurement result: IR (NaCl), ν ($cm^{-1}$): 2935 (Alkyl C—H), 1643 (C=C), 1581 (Ar C—C), 1512, 1338 (—$NO_2$)

$^1$H NMR measurement result: (measurement condition: 300 MHz, $CDCl_3$, δ, ppm, 25° C.): 8.06-8.01 (m, ArH, 1H), 7.96 (dd, J=11.0, 2.4, ArH, 1H), 7.02 (t, J=8.7, ArH, 1H), 5.96-5.94 (m, vinyl proton, 1H), 5.23-5.22 (m, vinyl proton, 2H), 4.18 (t, J=6.6, —$CH_2$—, 2H), 2.66-2.59 (m, —$CH_2$—, 2H)

$^{13}$C NMR measurement result: (measurement condition: 75 MHz, $CDCl_3$, δ, ppm, 25° C.): 153.0 (d, J=5.0), 151.3 (d, J=234.2), 140.9 (d, J=10.1), 133.3, 121.0 (d, J=3.5), 118.1, 113.1 (d, J=2.4), 112.4 (d, J=22.8), 69.1, 33.3

Synthesis of 1,7-bis[4-(2-fluoro-4-nitrophenoxy)butyl]-1,1,3,3,5,5,7,7-octamethyltetrasiloxane (2f)

To 1,1,3,3,5,5,7,7-octamethyltetrasiloxane (1.15 g; 3.87 mmol) dissolved in 10 mL of toluene, the above 4-(3-butenyloxy)-3-fluoronitrobenzene (1d) (2.12 g; 10.0 mmol) and Karsted catalyst (10 drops; a 2% xylene solution of platinum divinyl tetramethyldisiloxane complex) were added. The reaction solution was heated to reflux for 24 hours in a nitrogen atmosphere, and then subjected to a reduced pressure to remove toluene. The obtained material was purified by column chromatography using methylene chloride:hexane (4:6, volume ratio) to obtain a light yellow oily material of 1,7-bis[4-(2-fluoro-4-nitrophenoxy)butyl]-1,1,3,3,5,5,7,7-octamethyltetrasiloxane (20 (2.46 g, 90% of yield) represented by the following formula.

Various measurements were carried out with regard to the obtained (2f), and results are shown below.

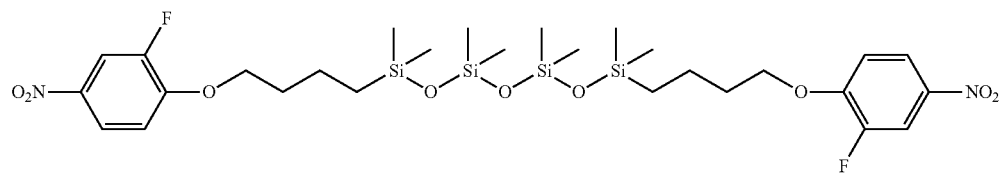

(2f)

IR measurement result: (NaCl), ν ($cm^{-1}$): 2958 (Alkyl C—H), 1605 (Ar C—C), 1524, 1346 (—$NO_2$), 1257 (Si—C)

$^1$H NMR measurement result: (measurement condition: 300 MHz, $CDCl_3$, δ, ppm, 25° C.): 8.05-8.01 (m, J=9.9, ArH, 2H), 7.96 (dd, J=10.5, 2.4, ArH, 2H), 7.01 (t, J=7.8, ArH, 2H), 4.13 (t, J=6.6, —$CH_2$—, 4H), 1.94-1.84 (m, —$CH_2$—, 4H), 1.61-1.48 (m, —$CH_2$—, 4H), 0.63-0.58 (m, —$CH_2$—, 4H), 0.08 (s, Si—$CH_3$, 12H), 0.04 (s, Si—$CH_3$, 12H)

$^{13}$C NMR measurement result: (measurement condition: 75 MHz, $CDCl_3$, δ, ppm, 25° C.): 153.2 (d, J=17.9), 151.4 (d, J=257.1), 140.7 (d, J=6.8), 121.0 (d, J=4.0), 112.9 (d, J=2.1), 112.4 (d, J=23.0), 69.6, 32.4, 19.7, 18.0, 1.30, 0.291

Synthesis of 1,7-bis[4-(4-amino-2-fluorophenoxy)butyl]-1,1,3,3,5,5,7,7-octamethyltetrasiloxane (3f)

2.18 g of the above (2f) (3.09 mmol) and 10 mL of a 10 wt % of Pd/C (0.0233 g) ethyl acetate solution were mixed, and stirred for 2 days in a nitrogen atmosphere at room temperature. The solution was filtrated by Celite and then concentrated to obtain a colorless oily material of 1,7-bis[4-(4-amino-2-fluorophenoxy)butyl]-1,1,3,3,5,5,7,7-octamethyltetrasiloxane (30 (1.98 g, 99% of yield) represented by the following formula. Various measurements were carried out with regard to the obtained (3f), and results are shown below.

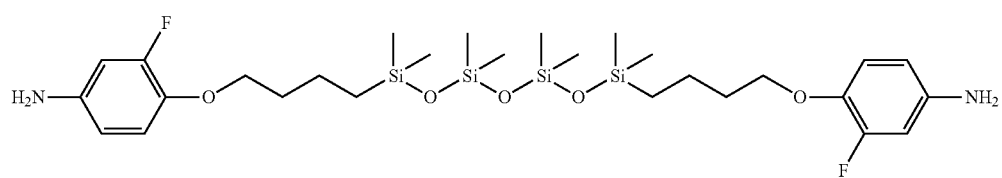

(3f)

IR measurement result: (NaCl), v (cm$^{-1}$): 3375 (N—H), 2958 (Alkyl C—H), 1639 (N—H), 1589 (Ar C—C), 1257 (Si—C)

$^1$H NMR measurement result: (measurement condition: 300 MHz, CDCl$_3$, δ, ppm, 25° C.): 6.79 (t, J=9.0, ArH, 2H), 6.44 (dd, J=12.6, 2.4, ArH, 2H), 6.37-6.33 (m, ArH, 2H), 3.94 (t, J=6.6, —CH$_2$—, 4H), 3.49 (s, NH$_2$, 4H), 1.83-1.73 (m, —CH$_2$—, 4H), 1.55-1.44 (m, —CH$_2$—, 4H), 0.62-0.56 (m, —CH$_2$—, 4H), 0.08 (s, Si—CH$_3$, 12H), 0.05 (s, Si—CH$_3$, 12H)

$^{13}$C NMR measurement result: (measurement condition: 75 MHz, CDCl$_3$, δ, ppm, 25° C.): 153.9 (d, J=244.2), 141.3 (d, J=9.3), 139.6 (d, J=11.3), 118.0 (d, J=2.6), 110.5 (d, J=3.2), 104.2 (d, J=21.8), 70.8, 33.1, 19.8, 18.1, 1.31, 0.284

Synthesis of Liquid Crystal Polyimide (6k)

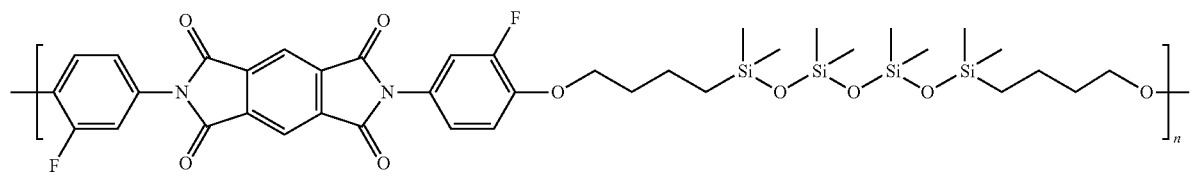

1.083 g (1.68 mmol) of (3f) was dissolved in 8.19 g of NMP, 0.366 g (1.68 mmol) of PMDA was added thereto, and thus obtained solution was stirred for 12 hours at room temperature. The obtained polyamide acid was casted on a glass substrate in a nitrogen atmosphere, stepwise heated by a hot plate (heat imidization), and then finally heated at 200° C. to obtain a turbid yellow film of liquid crystal polyimide (6k).

Example 8

Synthesis of 4-(3-butenyloxy)-2-fluoronitrobenzene (1g)

To an acetonitrile (25 mL) solution of 3-fluoro-4-nitrophenol (1.57 g; 10.0 mmol) and potassium carbonate (2.09 g; 15.1 mmol), 4-bromo-1-butene (2.21 g; 16.0 mmol) was added, and the mixture was refluxed and then reacted overnight. After completion of the reaction, the solution was filtrated by Celite, and then the filtrate was concentrated under a reduced pressure. The residue was purified by column chromatography (solvent, hexane:methylene chloride=6:4) using methylene chloride, and then the effluent was concentrated to obtain 4-(3-butenyloxy)-2-fluoronitrobenzene (1g) (1.71 g, 81% of yield, a light yellow oil) represented by the following formula.

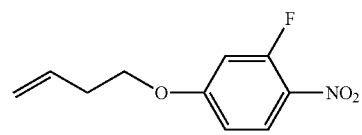

(1g)

Various measurements were carried out with regard to the obtained 4-(3-butenyloxy)-2-fluoronitrobenzene (1g), and results are shown below.

IR measurement result: (NaCl), v (cm$^{-1}$): 2947 (Alkyl C—H), 1643 (C=C), 1612 (Ar C—C), 1520, 1346 (—NO$_2$)

$^1$H NMR measurement result: (measurement condition: 300 MHz, CDCl$_3$, δ, ppm, 25° C.): 8.11-8.05 (m, ArH, 1H), 6.77-6.70 (m, ArH, 2H), 5.93-5.80 (m, vinyl proton, 1H), 5.22-5.12 (m, vinyl proton, 2H), 4.09 (t, J=6.9, —CH$_2$—, 2H), 2.61-2.54 (m, —CH$_2$—, 2H)

$^{13}$C NMR measurement result: (measurement condition: 75 MHz, CDCl$_3$, δ, ppm, 25° C.): 164.8 (d, J=10.8), 157.6 (d, J=263.4), 133.4, 128.0 (d, J=1.9), 118.0, 110.9 (d, J=4.0), 103.9, 103.6, 68.6, 33.3

Synthesis of 1,7-bis[4-(3-fluoro-4-nitrophenoxy) butyl]-1,1,3,3,5,5,7,7-octamethyltetrasiloxane (2g)

To 1,1,3,3,5,5,7,7-octamethyltetrasiloxane (0.705 g; 2.49 mmol) dissolved in 8 mL of toluene, the above 4-(3-butenyloxy)-2-fluoronitrobenzene (1g) (1.55 g; 7.34 mmol) and Karsted catalyst (10 drops; a 2% xylene solution of platinum divinyl tetramethyldisiloxane complex) were added. The solution was heated to reflux for 24 hours in a nitrogen atmosphere, and then subjected to a reduced pressure to remove toluene. The obtained material was purified by column chromatography using methylene chloride:hexane (4:6, volume ratio) to obtain a light yellow oily material of 1,7-bis[4-(3-fluoro-4-nitrophenoxy)butyl]-1,1,3,3,5,5,7,7-octamethyltetrasiloxane (2g) (1.66 g, 95% of yield) represented by the following formula.

Various measurements were carried out with regard to the obtained (2g), and results are shown below.

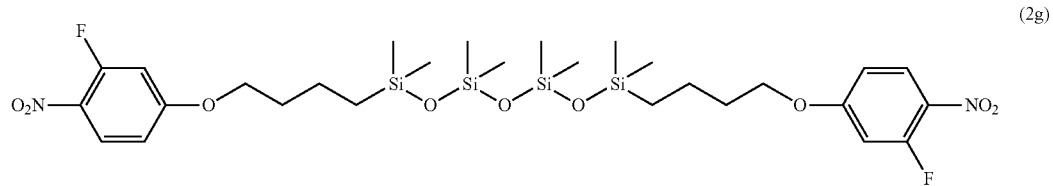 [SMILES: C[Si](C)(CCCCOc1ccc([N+](=O)[O-])c(F)c1)O[Si](C)(C)O[Si](C)(C)O[Si](C)(C)CCCCOc1ccc([N+](=O)[O-])c(F)c1]

(2g)

IR measurement result: (NaCl), ν (cm$^{-1}$): 2958 (Alkyl C—H), 1612 (Ar C—C), 1520, 1346 (—NO$_2$), 1257 (Si—C)

$^1$H NMR measurement result: (measurement condition: 300 MHz, CDCl$_3$, δ, ppm, 25° C.): 8.10-8.04 (m, ArH, 2H), 6.76-6.68 (m, ArH, 4H), 4.03 (t, J=6.3, —CH$_2$—, 4H), 1.89-1.79 (m, —CH$_2$—, 4H), 1.56-1.46 (m, —CH$_2$—, 4H), 0.62-0.57 (m, —CH$_2$—, 4H), 0.08 (s, Si—CH$_3$, 12H), 0.04 (s, Si—CH$_3$, 12H)

$^{13}$C NMR measurement result: (measurement condition: 75 MHz, CDCl$_3$, δ, ppm, 25° C.): 165.1 (d, J=10.4), 157.6 (d, J=262.9), 128.0 (d, J=2.4), 110.9 (d, J=3.0), 103.8, 103.4, 69.1, 32.4, 19.8, 17.9, 1.34, 0.304

Synthesis of 1,7-bis[4-(4-amino-3-fluorophenoxy) butyl]-1,1,3,3,5,5,7,7-octamethyltetrasiloxane (3g)

1.66 g of the above (2g) (2.35 mmol) and 10 mL of a 10 wt % Pd/C (0.0275 g) ethyl acetate solution were mixed, and stirred for 2 days in a hydrogen atmosphere at room temperature. The solution was filtrated by Celite and then concentrated to obtain a colorless oily material of 1,7-bis[4-(4-amino-3-fluorophenoxy)butyl]-1,1,3,3,5,5,7,7-octamethyltetrasiloxane (3g) (1.51 g, 99% of yield) represented by the following formula. Various measurements were carried out with regard to the obtained (3 g), and results are shown below.

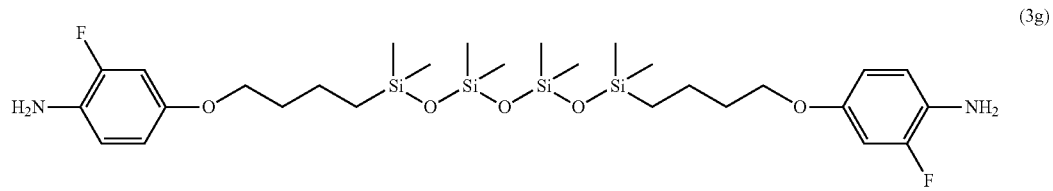

(3g)

IR measurement result: (NaCl), ν (cm$^{-1}$): 3371 (N—H), 2958 (Alkyl C—H), 1639 (N—H), 1593 (Ar C—C), 1238 (Si—C)

$^1$H NMR measurement result: (measurement condition: 300 MHz, CDCl$_3$, δ, ppm, 25° C.): 6.70 (t, J=8.4, ArH, 2H), 6.61 (dd, J=12.5, 2.4, ArH, 2H), 6.55-6.51 (m, ArH, 2H), 3.86 (t, J=6.3, —CH$_2$—, 4H), 3.41 (s, NH$_2$, 4H), 1.81-1.72 (m, —CH$_2$—, 4H), 1.54-1.43 (m, —CH$_2$—, 4H), 0.62-0.56 (m, —CH$_2$—, 4H), 0.08 (s, Si—CH$_3$, 12H), 0.05 (s, Si—CH$_3$, 12H)

$^{13}$C NMR measurement result: (measurement condition: 75 MHz, CDCl$_3$, δ, ppm, 25° C.): 152.5 (d, J=9.3), 152.1 (d, J=237.6), 127.6 (d, J=13.6), 117.7 (d, J=5.0), 110.7 (d, J=3.5), 103.1 (d, J=21.6), 68.5, 32.9, 19.9, 18.1, 1.35, 0.332

Synthesis of Liquid Crystal Polyimide (6l)

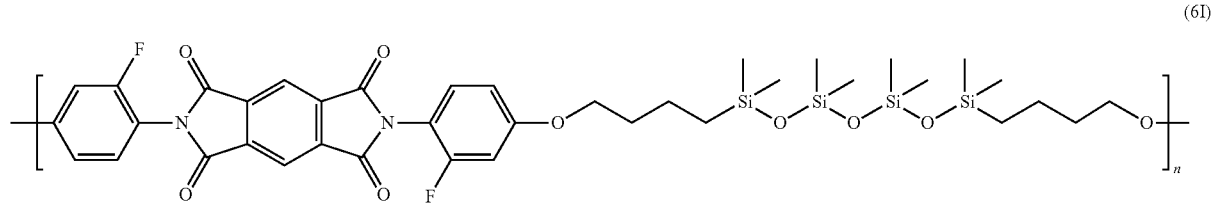

(6l)

1.083 g (1.68 mmol) of (3 g) was dissolved in 8.19 g of NMP, 0.366 g (1.68 mmol) of PMDA was added thereto, and thus obtained solution was stirred for 12 hours at room temperature. The obtained polyamide acid was casted on a glass substrate in a nitrogen atmosphere, stepwise heated by a hot plate (heat imidization), and then finally heated at 200° C. to obtain a turbid yellow film of liquid crystal polyimide (61).

Example 9

Synthesis of 4-(3-butenyloxy)-3-chloronitrobenzene (1h)

To an acetonitrile (40 mL) solution of 2-chloro-4-nitrophenol (2.60 g; 15.0 mmol) and potassium carbonate (2.74 g; 19.8 mmol), 4-bromo-1-butene (2.81 g; 20.4 mmol) was added, and the mixture was refluxed and then reacted overnight. After completion of the reaction, the solution was filtrated by Celite, and then the filtrate was concentrated under a reduced pressure. The residue was purified by flash column chromatography using methylene chloride, and then the effluent was concentrated to obtain 4-(3-butenyloxy)-3-chloronitrobenzene (1 h) (2.32 g, 68% of yield, a light yellow solid, melting point of from 39 to 40° C.) represented by the following formula.

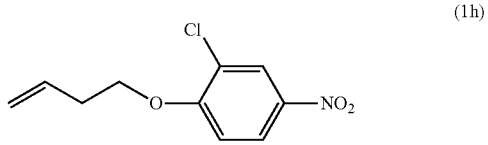

(1h)

Various measurements were carried out with regard to the obtained 4-(3-butenyloxy)-3-chloronitrobenzene (1h), and results are shown below.

IR measurement result: (NaCl), ν (cm$^{-1}$): 2958 (Alkyl C—H), 1643 (C=C), 1585 (Ar C—C), 1512, 1342(—NO$_2$)

$^1$H NMR measurement result: (measurement condition: 300 MHz, CDCl$_3$, δ, ppm, 25° C.): 8.28 (d, J=2.7, ArH, 1H), 8.14 (dd, J=9.0, 2.7, ArH, 1H), 6.97 (d, J=9.3, ArH, 1H), 5.99-5.85 (m, vinyl proton, 1H), 5.25-5.14 (m, vinyl proton, 2H), 4.18 (t, J=6.6, —CH$_2$—, 2H), 2.68-2.61 (m, —CH$_2$—, 2H)

$^{13}$C NMR measurement result: (measurement condition: 75 MHz, CDCl$_3$, δ, ppm, 25° C.): 159.6, 141.1, 133.3, 126.0, 124.0, 123.5, 118.0, 111.8, 69.2, 33.2

Synthesis of 1,7-bis[4-(2-chloro-4-nitrophenoxy)butyl]-1,1,3,3,5,5,7,7-octamethyltetrasiloxane (2h)

To 1,1,3,3,5,5,7,7-octamethyltetrasiloxane (0.544 g; 1.92 mmol) dissolved in 7 mL of toluene, the above 4-(2-butenyloxy)-3-chloronitrobenzene (1 h) (1.37 g; 6.02 mmol) and Karsted catalyst (10 drops; a 2% xylene solution of platinum divinyl tetramethyldisiloxane complex) were added. The reaction solution was heated to reflux for 24 hours in a nitrogen atmosphere, and then subjected to a reduced pressure to remove toluene. The obtained material was purified by column chromatography using methylene chloride:hexane (4:6, volume ratio) to obtain a light yellow oily material of 1,7-bis[4-(2-chloro-4-nitrophenoxy)butyl]-1,1,3,3,5,5,7,7-octamethyltetrasiloxane (2h) (1.24 g, 87% of yield) represented by the following formula.

Various measurements were carried out with regard to the obtained (2h), and results are shown below.

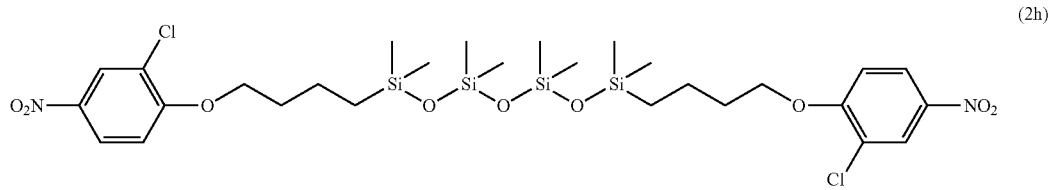

(2h)

IR measurement result: (NaCl), ν (cm$^{-1}$): 2958 (Alkyl C—H), 1585 (Ar C—C), 1516, 1342(—NO$_2$), 1257(Si—C)

$^1$H NMR measurement result: (measurement condition: 300 MHz, CDCl$_3$, δ, ppm, 25° C.): 8.26 (d, J=3.0, ArH, 2H), 8.12 (dd, J=9.3, 3.0, ArH, 2H), 6.96 (d, J=9.0, ArH, 2H), 4.13 (t, J=6.3, —CH$_2$—, 4H), 1.95-1.86 (m, —CH$_2$—, 4H), 1.62-1.52 (m, —CH$_2$—, 4H), 0.64-0.59 (m, —CH$_2$—, 4H), 0.09 (s, Si—CH$_3$, 12H), 0.04 (s, Si—CH$_3$, 12H)

$^{13}$C NMR measurement result: (measurement condition: 75 MHz, CDCl$_3$, δ, ppm, 25° C.): 159.9, 141.1, 126.1, 124.1, 123.5, 111.8, 69.7, 32.3, 19.8, 17.9, 1.33, 0.275

Synthesis of 1,7-bis[4-(4-amino-2-chlorophenoxy)butyl]-1,1,3,3,5,5,7,7-octamethyltetrasiloxane (3h)

0.936 g of the above (2h) (1.38 mmol) and 10 mL of a 10 wt % Pd/C (0.0469 g) ethyl acetate solution were mixed, and stirred for 2 days in a hydrogen atmosphere at room temperature. The solution was filtrated by Celite and then concentrated to obtain a brown oily material of 1,7-bis[4-(4-amino-2-chlorophenoxy)butyl]-1,1,3,3,5,5,7,7-octamethyltetrasiloxane (3h) (0.860 g, 99% of yield) represented by the following formula. Various measurements were carried out with regard to the obtained (3h), and results are shown below.

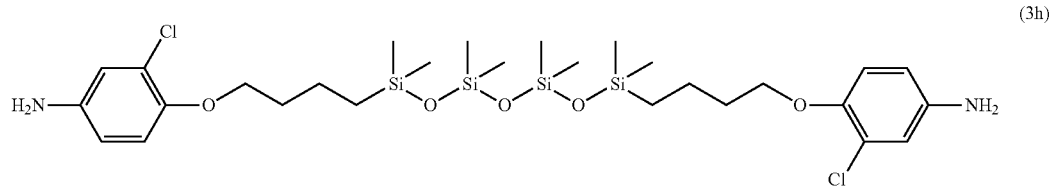 [SMILES: C[Si](C)(CCCCOc1ccc([N+](=O)[O-])cc1Cl)O[Si](C)(C)O[Si](C)(C)O[Si](C)(C)CCCCOc1ccc([N+](=O)[O-])cc1Cl]

(3h)

IR measurement result: (NaCl), v (cm$^{-1}$): 2958 (Alkyl C—H), 1624 (N—H), 1500 (Ar C—C), 1257(Si—C)

$^1$H NMR measurement result: (measurement condition: 300 MHz, CDCl$_3$, δ, ppm, 25° C.): 6.76 (d, J=8.1, ArH, 2H), 6.74 (d, J=2.4, ArH, 2H), 3.93 (t, J=6.3, —CH$_2$—, 4H), 3.65 (s, NH$_2$, 4H), 1.85-1.76 (m, —CH$_2$—, 4H), 1.58-1.47 (m, —CH$_2$—, 12H), 0.63-0.57 (m, —CH$_2$—, 4H), 0.08 (s, Si—CH$_3$, 2H), 0.05 (s, Si—CH$_3$, 12H)

$^{13}$C NMR measurement result: (measurement condition: 75 MHz, CDCl$_3$, δ, ppm, 25° C.): 150.0, 140.6, 124.3, 117.5, 116.2, 114.6, 70.2, 33.0, 19.8, 18.1, 1.36, 0.333

Synthesis of Liquid Crystal Polyimide (6m)

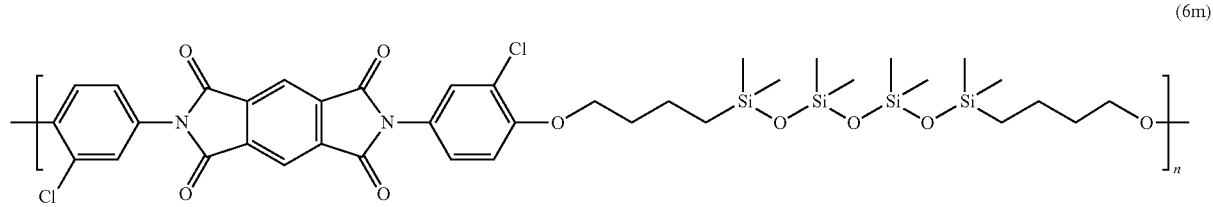

(6m)

1.139 g (1.68 mmol) of the above (3h) was dissolved in 8.53 g of NMP, 0.366 g (1.68 mmol) of PMDA was added thereto, and thus obtained solution was stirred for 12 hours at room temperature. The obtained polyamide acid was casted on a glass substrate in a nitrogen atmosphere, stepwise heated by a hot plate (heat imidization), and then finally heated at 200° C. to obtain a turbid yellow film of liquid crystal polyimide (6m).

Example 10

Synthesis of Liquid Crystal Polyimide (6n)

A film of polyimide (6n) represented by the following formula was obtained in the same manner as in Example 7 except that PMDA used in Example 7 was changed to BPDA.

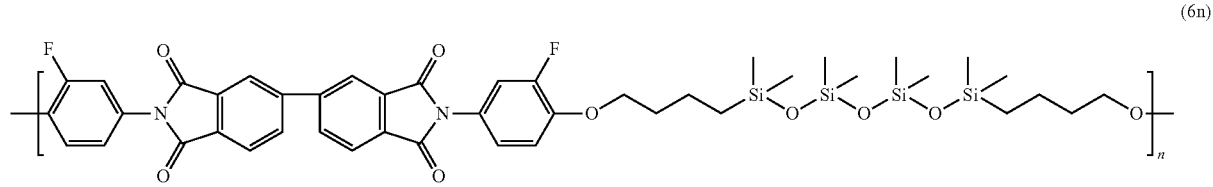

(6n)

Example 11

Synthesis of Liquid Crystal Polyimide (6o)

A film of the liquid crystal polyimide (6o) represented by the following formula was obtained in the same manner as in Example 9 except that PMDA used in Example 9 was changed to BPDA.

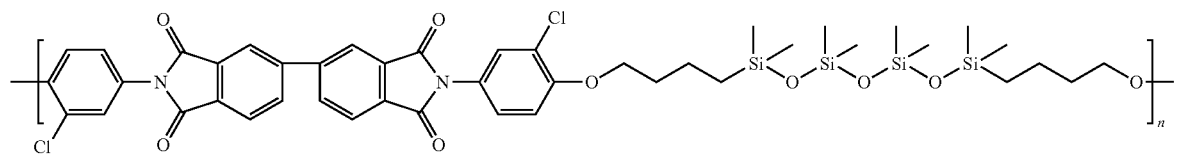

(6o)

The phase transition temperatures of the liquid crystal polyimides synthesized in Examples 7 to 11 are shown in Table 2. Further, Ar, $R^1$ and $R^2$ in Table 2 correspond to Ar, $R^1$ and $R^2$ in the following formulae, respectively.

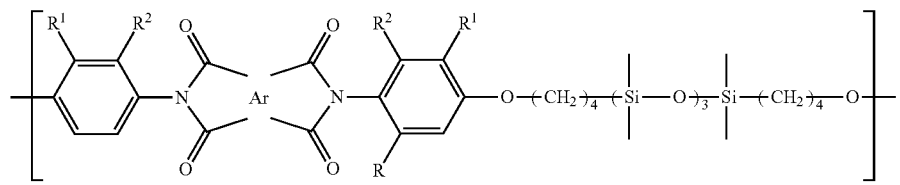

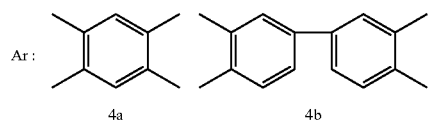

Ar: 4a, 4b

TABLE 2

| Polyimide | Ar | $R^1$ | $R^2$ | $T_{cr\text{-}lc}$ [° C.][a] | $T_{lc\text{-}lc}$ [° C.][a] | $T_{lc\text{-}i}$ [° C.][a] |
|---|---|---|---|---|---|---|
| Ex. 7 | 6k | 4a | F | H | 216 | —[b] | 249 |
| Ex. 8 | 6l | 4a | H | F | 147 | —[b] | 169 |
| Ex. 9 | 6m | 4a | Cl | H | 208 | —[b] | 222 |
| Ex. 10 | 6n | 4b | F | H | 134 | 211 | 238 |
| Ex. 11 | 6o | 4b | Cl | H | 178 | 198 | 230 |

[a] transition temperature was determined from a peak top at the time of temperature fall with a rate of 10° C./min observed by using DSC.
[b] means that liquid crystal phase - liquid crystal phase transition was not observed.
$T_{cr\text{-}lc}$ indicates crystal phase → liquid crystal phase transition temperature.
$T_{lc\text{-}lc}$ indicates liquid crystal phase → liquid crystal phase transition temperature.
$T_{lc\text{-}i}$ indicates liquid crystal phase → isotropic phase transition temperature.

Reference Example 5

Synthesis of 1,1,3,3,5,5,7,7,9,9,11,11-dodecamethylhexasiloxane (1A)

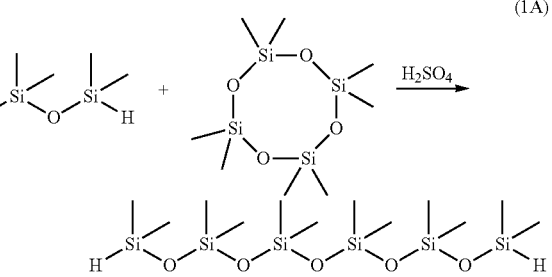

Yield 50%

As described in the above scheme, according to the following document, 1,1,3,3,5,5,7,7,9,9,11,11-dodecamethylhexasiloxane (1A) was synthesized (6.42 g, 50% of yield).

Document: Journal of Applied Polymer Science Vol. 108, 1901-1907 (2008). (82% of yield)

Synthesis of 1,11-bis[4-(4-nitrophenoxy)butyl]-1,1,
3,3,5,5,7,7,9,9,11,11-dodecamethylhexasiloxane
(2A)

To 1,1,3,3,5,5,7,7,9,9,11,11-dodecamethylhexasiloxane (1A) (0.647 g; 1.50 mmol) dissolved in 5 mL of toluene, the above 4-(3-butenyloxy)nitrobenzene (0.709 g; 3.67 mmol) and Karsted catalyst (10 drops; a 2% xylene solution of platinum divinyl tetramethyldisiloxane complex) were added. The reaction solution was heated to reflux for 24 hours in a nitrogen atmosphere, and then subjected to a reduced pressure to remove toluene. The obtained material was purified by column chromatography using methylene chloride:hexane (4:6, volume ratio) to obtain a light yellow oily material of 1,11-bis[4-(4-nitrophenoxy)butyl]-1,1,3,3,5,5,7,7,9,9,11,11-dodecamethylhexasiloxane (2A) (1.18 g, 96% of yield) represented by the following formula.

Various measurements were carried out with regard to the obtained (2A), and results are shown below.

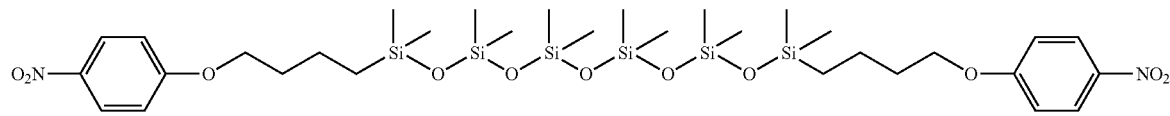

(2A)

IR measurement result: (NaCl), v (cm$^{-1}$): 2958 (Alkyl C—H), 1593 (Ar C—C), 1516, 1342 (—NO$_2$), 1261 (Si—C)

$^1$H NMR measurement result: (measurement condition: 300 MHz, CDCl$_3$, δ, ppm, 25° C.): 8.18 (d, J=9.6, ArH, 4H), 6.93 (d, J=9.3, ArH, 4H), 4.05 (t, J=6.3, —CH$_2$—, 4H), 1.89-1.80 (m, —CH$_2$—, 4H), 1.57-1.47 (m, —CH$_2$—, 4H), 0.63-0.57 (m, —CH$_2$—, 4H), 0.09 (s, Si—CH$_3$, 12H), 0.06 (s, Si—CH$_3$, 12H), 0.05 (s, Si—CH$_3$, 12H)

$^{13}$C NMR measurement result: (measurement condition: 75 MHz, CDCl$_3$, δ, ppm, 25° C.): 164.4, 141.4, 126.0, 114.5, 68.6, 32.6, 19.8, 18.0, 1.33, 1.25, 0.314

Synthesis of 1,11-bis[4-(4-aminophenoxy)butyl]-1,1,
3,3,5,5,7,7,9,9,11,11-dodecamethylhexasiloxane
(3A)

1.02 g of the above (2A) (1.25 mmol) and 10 mL of a 10 wt % Pd/C (0.0203 g) ethyl acetate solution were mixed, and stirred for 2 days in a hydrogen atmosphere at room temperature. The solution was filtrated by Celite and then concentrated to obtain a colorless oily material of 1,11-bis[4-(4-aminophenoxy)butyl]-1,1,3,3,5,5,7,7,9,9,11,11-dodecamethylhexasiloxane (3A) (0.943 g, 99% of yield) represented by the following formula. Various measurements were carried out with regard to the obtained (3A), and results are shown below.

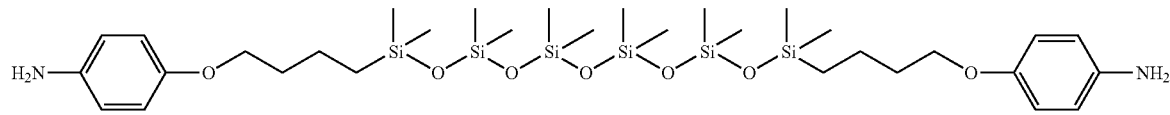

(3A)

IR measurement result: (NaCl), v (cm$^{-1}$): 3363 (N—H), 2958 (Alkyl C—H), 1624 (N—H), 1512 (Ar C—C), 1257 (Si—C)

$^1$H NMR measurement result: (measurement condition: 300 MHz, CDCl$_3$, δ, ppm, 25° C.): 6.74 (d, J=9.0, ArH, 4H), 6.63 (d, J=8.7, ArH, 4H), 3.88 (t, J=6.3, —CH$_2$—, 4H), 3.41 (s, NH$_2$, 4H), 1.82-1.73 (m, —CH$_2$—, 4H), 1.55-1.44 (m, —CH$_2$—, 12H), 0.63-0.57 (m, —CH$_2$—, 4H), 0.09 (s, Si—CH$_3$, 12H), 0.08 (s, Si—CH$_3$, 12H), 0.06 (s, Si—CH$_3$, 12H)

$^{13}$C NMR measurement result: (measurement condition: 75 MHz, CDCl$_3$, δ, ppm, 25° C.): 152.5, 139.9, 116.5, 115.8, 68.4, 33.1, 19.9, 18.1, 1.33, 1.23, 0.314

Synthesis of Polyimide (6A)

1.272 g (1.68 mmol) of the above (3A) was dissolved in 9.28 g of NMP, 0.366 g (1.68 mmol) of PMDA was added thereto, and thus obtained solution was stirred for 12 hours at room temperature. The obtained polyamide acid was casted on a glass substrate in a nitrogen atmosphere, stepwise heated by a hot plate (heat imidization), and then finally heated at 200° C. to obtain a turbid yellow film of polyimide (6A).

[Evaluation of Thermal Conductivity]

According to the following method, evaluation of the thermal conductivity of a liquid crystal polyimide film and evaluation of the thermal conductivity of a composite of liquid crystal polyimide and aluminum nitride were carried out by using ai-Phase-Mobile 1u (ai-Phase Co., Ltd.). The thermal diffusivity of each sample was evaluated by a periodic heating method, and then the specific gravity and the specific heat of each sample were multiplied to obtain thermal conductivity to obtain its thermal conductivity.

Measurement of Thermal Conductivity of a Liquid Crystal Polyimide Film

On a mold-release PET film, the polyamide acid described in liquid crystal polyimide (6h) synthesis section of Example 1 was applied. Thus obtained sample was heated at 100° C. for 60 minutes and then at 150° C. for 60 minutes by a heating oven in the atmosphere, followed by holding for further 30 minutes under a reduced pressure and being allowed to cool to room temperature to obtain a polyimide film (polyimide (6h)

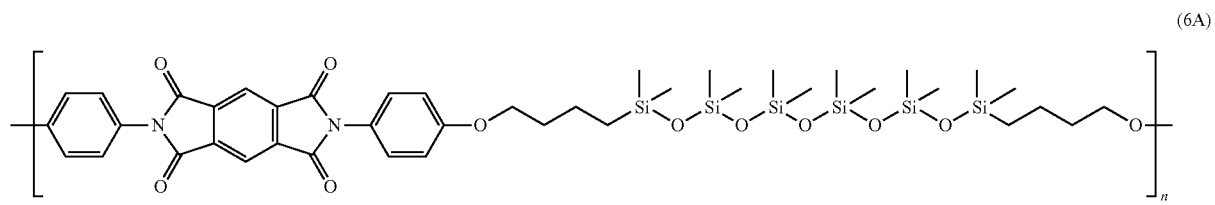

(6A)

Reference Example 6

Synthesis of Polyimide (6B)

A film of polyimide (6B) represented by the following formula was obtained in the same manner as in Reference Example 6 except that PMDA used in Reference Example 5 was changed to BPDA.

(film thickness, 107 μm)) on the mold-release PET. The thermal conductivity across the thickness of a self-supporting film peeled from the mold-release PET was evaluated and then found to be 0.21 W/m·K. The film was placed on a mold-release treated slide glass, heated to 280° C. by a hot plate to have an isotropic phase, and held for 10 minutes. Thereafter, the temperature was lowered to 240° C., and then

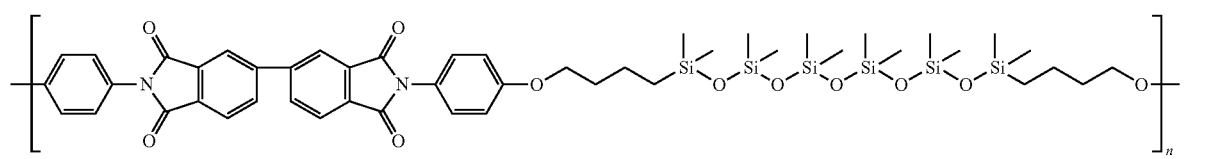

(6B)

[Evaluation]

Liquid crystallinity of each of the polyimides synthesized in the above Examples 7 to 11 and Reference Examples 5 and 6 was examined, and as a result, each of liquid crystal polyimides (6K), (6l), (6m), (6n) and (6o) synthesized in Examples 7 to 11 was found to have liquid crystallinity. On the other hand, each of (6A) and (6B) was found to have no liquid crystallinity. This is considered to be because mesogen it was held for 30 minutes to have a liquid crystal phase, followed by being allowed to cool to room temperature to obtain a liquid crystal film of polyimide (6h) on the mold-release glass. The thermal conductivity across the thickness of a self-supporting film peeled from the mold-release glass was evaluated and then found to be 0.24 W/m·K, whereby improvement in thermal conductivity as compared to before liquid crystallization was confirmed.

Measurement of Thermal Conductivity of a Aluminum Nitride/Polyimide Composite

To 4.95 g of MEK (2-butanone), 0.05 g of BYK-111 (manufactured by BYK Chemie) were added and mixed uniformly. Further, 5.0 g of aluminum nitride (AlN; grade H, manufactured by Tokuyama Co., Ltd.) was added, and then ultrasonic wave was applied thereto to obtain a uniform AlN/MEK dispersion (50 wt %). 0.372 g of a 15 wt % polyamide acid solution (solvent, NMP) described in liquid crystal polyimide (6h) synthesis section of Example 1 was introduced to a mortar, and then 0.278 g of a 50 wt % AlN dispersion and 0.08 g of MEK were added thereto, followed by mixing in the mortar until it became homogeneous. The obtained paste was applied on a mold-release PET film by a spin coating to obtain a thin film (spin coating condition: 800 rpm×5 sec+2,500 rpm×15 sec). The sample on the mold-release PET was subjected to prebaking for 10 minutes at 80° C., thereby to obtain a composite film of polyamide acid/AlN. The obtained film was heated at 100° C. for 30 minutes and then at 150° C. 30 minutes by a heating oven in the atmosphere, followed by holding for further 30 minutes under a reduced pressure and being allowed to cool to room temperature to obtain a composite film of polyimide/AlN on the mold-release PET. A self-supporting film was obtained by peeling a sample film from the mold-release PET. According to TG-DTA measurement, the wt % of AlN in the composite film was found to be 76.5 wt %. The thermal conductivity of the sample film was evaluated and then found to be 1.5 W/m·K.

The obtained film was sandwiched by two mold-released slide glasses, pressed with a pressure of about 1 MPa by a hot press machine, subjected to the temperature rise until 280° C., and then held for 10 minutes. Thereafter, its temperature was lowered to 240° C. and then it was held for 30 minutes for having a liquid crystal phase, followed by being cooled to room temperature to obtain a liquid crystal polyimide/AlN composite film between the mold-released glasses. The thermal conductivity of the composite film was evaluated and then found to be 2.9 W/m·K, whereby significant improvement in thermal conductivity as compared to before liquid crystallization was confirmed. On the other hand, in a case where the temperature treatment condition was set to be heating at 280° C. for 10 minutes+30 minutes and then followed by being allowed to cool (the temperature treatment condition for having no liquid crystal phase), its thermal conductivity was found to be 2.0 W/m"K. Accordingly, expression of thermal conductivity of the composite due to expression of liquid crystal was confirmed.

Industrial Applicability

The liquid crystal polyimide of the present invention can acquire liquid crystallinity at a relatively low temperature, whereby it is expected to have a high thermal conductivity. Therefore, it can be used for an element such as a semiconductor element which is required to have a high thermal conductivity and prepared by using a component having an insufficient heat resistance, and can be applied to a various field.

This application is a continuation of PCT Application No. PCT/JP2010/057971 filed on May 11, 2010, which is based upon and claims the benefit of priority from Japanese Patent Application No. 2009-115031 filed on May 11, 2009 and Japanese Patent Application No. 2009-260493 filed on Nov. 13, 2009. The contents of those applications are incorporated herein by reference in its entirety.

What is claimed is:

1. A liquid crystal polyimide, having liquid crystallinity and comprising a repeating unit of formula (I):

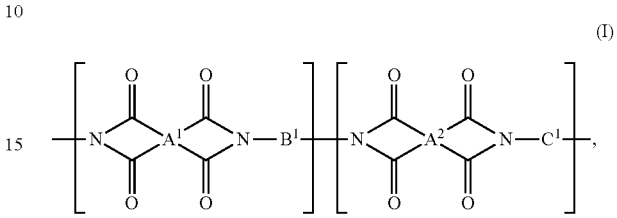

wherein:
A$^1$ and A$^2$ are each

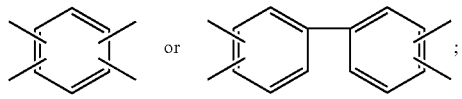

B$^1$ is a residue of a bis(amino)polysiloxane unit of formula (II):

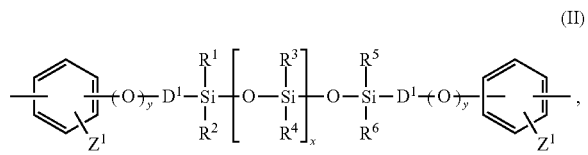

wherein:
R$^1$ to R$^6$ are each independently a lower alkyl group;
x is 0, 1, or 2;
D$^1$ is an alkylene group comprising 4 to 6 carbon atoms;
y is 0 or 1; and
z$^1$ is —H or a halogen; and
C$^1$ is a residue of an organic diamine,
wherein, in formula (II), D$^1$ is an alkylene group comprising 4 atoms and x is 1 or 2, when A$^1$ and A$^2$ are

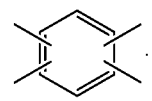

2. The liquid crystal polyimide of claim 1, wherein, in formula (II), R$^1$ to R$^6$ are each independently an alkyl group comprising from 1 to 3 carbon atoms.

3. The liquid crystal polyimide of claim 2, wherein, in formula (II), each of R$^1$ to R$^6$ is a methyl group.

4. The liquid crystal polyimide of claim 1, having a liquid crystal transition temperature of at most 260° C.

5. The liquid crystal polyimide of claim 1, synthesized via a polyamide acid obtained by reacting a bis(amino) polysiloxane, an organic diamine, and an acid dianhydride, wherein the bis(amino) polysiloxane has formula (i):

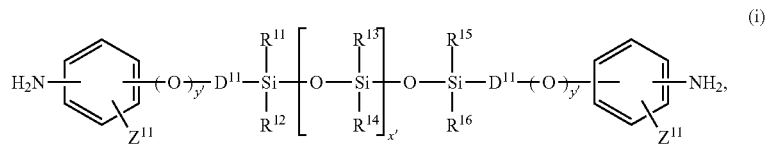

wherein:
- $R^{11}$ to $R^{16}$ are each independently a lower alkyl group;
- x' is 0, 1, or 2;
- $D^{11}$ is an alkylene group comprising from 4 to 6 carbon atoms;
- y' is 0 or 1; and
- $Z^{11}$ is —H or a halogen, and
- wherein the an acid dianhydride is 3,3',4,4'-biphenyltetracarboxylic acid dianhydride or pyromellitic acid dianhydride, and
- wherein, in formula (i), $D^{11}$ is an alkylene group comprising 4 atoms and x' is 1 or 2, when the acid anhydride is pyromellitic acid dianhydride.

6. A liquid crystal resin composition, comprising the liquid crystal polyimide of claim 1.

7. The liquid crystal resin composition of claim 6, further comprising a thermally conductive filler.

8. The liquid crystal resin composition of claim 6, which acquires liquid crystallinity when heated at a temperature of at most 260° C., and retains crystal structure even at 25° C. after being cooled.

9. A resin film comprising the liquid crystal resin composition of claim 6.

10. The liquid crystal polyimide of claim 1, in the form of a liquid crystal film having a thermal conductivity of at least 0.22 W/m·K.

11. The liquid crystal polyimide of claim 10, having a phase transition temperature of at most 260° C.

12. The liquid crystal polyimide of claim 1, wherein in formula (I), $A^1$ and $A^2$ are

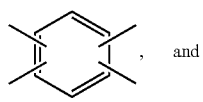, and wherein, in formula (II), x is 1.

13. The liquid crystal polyimide of claim 1, wherein in formula (I), $A^1$ and $A^2$ are

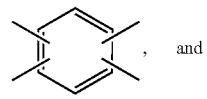, and wherein, in formula (II), x is 2.

14. The liquid crystal polyimide of claim 1, wherein in formula (I), $A^1$ and $A^2$ are

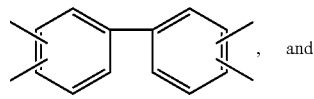, and wherein, in formula (II), x is 0.

15. The liquid crystal polyimide of claim 1, wherein in formula (I), $A^1$ and $A^2$ are

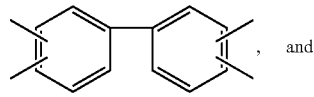, and wherein, in formula (II), x is 1.

16. The liquid crystal polyimide of claim 1, wherein in formula (I), $A^1$ and $A^2$ are

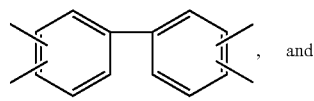, and wherein, in formula (II), x is 2.

17. The liquid crystal polyimide of claim 1, having a phase transition temperature of at most 255° C.

18. The liquid crystal polyimide of claim 1, having a phase transition temperature of at most 250° C.

* * * * *